US008566357B2

(12) United States Patent
Miyakawa

(10) Patent No.: US 8,566,357 B2
(45) Date of Patent: Oct. 22, 2013

(54) INFORMATION MANAGEMENT APPARATUS, DATA PROCESSING METHOD AND COMPUTER PROGRAM

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/500,854

(22) PCT Filed: Oct. 7, 2010

(86) PCT No.: PCT/JP2010/067646
§ 371 (c)(1),
(2), (4) Date: Apr. 6, 2012

(87) PCT Pub. No.: WO2011/043418
PCT Pub. Date: Apr. 14, 2011

(65) Prior Publication Data
US 2012/0197915 A1    Aug. 2, 2012

(30) Foreign Application Priority Data

Oct. 9, 2009   (JP) ................................ 2009-234897

(51) Int. Cl.
*G06F 17/30*    (2006.01)
(52) U.S. Cl.
USPC ............ 707/791; 707/802; 707/822; 707/828
(58) Field of Classification Search
USPC ................................. 707/600–899
See application file for complete search history.

(56) References Cited

U.S. PATENT DOCUMENTS

| 2002/0111172 A1 | 8/2002 | DeWolf et al. |
| 2004/0002814 A1 | 1/2004 | Gogic |
| 2004/0113772 A1* | 6/2004 | Hong Chou ............. 340/539.13 |

FOREIGN PATENT DOCUMENTS

| CN | 1395708 A | 2/2003 |
| JP | 2004-029940 A | 1/2004 |
| JP | 2004-318391 A | 11/2004 |

(Continued)

OTHER PUBLICATIONS

International Search Report of PCT/JP2010/067646 dated Nov. 30, 2010.

(Continued)

*Primary Examiner* — Isaac M Woo
(74) *Attorney, Agent, or Firm* — Sughrue Mion, PLLC

(57) ABSTRACT

In an information management apparatus, a data receiving section receives position data periodically from a plurality of mobile terminals. A second extracting section generates a power set to at least one position data, and generates a node composed of identification data of a user and object data as elements. A processing section registers on a node, a movement data set having as an element, at least one of the position data showing a position before movement to a position shown by the object data and the position data showing a position after the movement from a position shown by the object data. An abstracting section abstracts the object data an abstraction scheme with a priority determined according to the number of times of abstraction. A testing section lists up other nodes, each of which is different from the node of the object data in identification data, and same as the node in the object data, and which has a movement data set, of which a product with the movement data set of the node is an empty set, and output the object data of the node as anonymity data when the number of other nodes is equal to or more than a predetermined threshold value.

16 Claims, 23 Drawing Sheets

(56) References Cited

FOREIGN PATENT DOCUMENTS

| JP | 2005-031965 A | 2/2005 |
|---|---|---|
| JP | 2005-234866 A | 9/2005 |
| JP | 2005-244547 A | 9/2005 |
| JP | 2005-531263 A | 10/2005 |
| JP | 2005-346248 A | 12/2005 |
| JP | 2007-179500 A | 7/2007 |
| JP | 2007-219636 A | 8/2007 |
| WO | 2008/108158 A1 | 9/2008 |
| WO | 2009096015 A1 | 8/2009 |

OTHER PUBLICATIONS

Takuya Mori, et al.,"Report on Behavior Modeling and its Impact to Privaciness", Dai 71 Kai (Heisei 21 Nen) Zenkoku Taikai Koen Ronbunshu (3) Network Security, Dai 71 Kai (Heisei 21 Nen) Zenkoku Taikai, Information Processing Society of Japan, Mar. 10, 2009, pp. 3-345-3-346.

Communication issued Apr. 22, 2013; by State Intellectual Property Office of PR of China; in corresponding application No. 201080045407.6.

* cited by examiner

Fig. 1A RELATED ART

| # | ZIP | AGE | NATIONALITY | SYMPTOM |
|---|---|---|---|---|
| 1 | 13053 | 28 | RUSSIA | HEART DISEASE |
| 2 | 13068 | 29 | USA | HEART DISEASE |
| 3 | 13068 | 21 | JAPAN | INFECTION |
| 4 | 13053 | 23 | USA | INFECTION |
| 5 | 14853 | 31 | USA | CANCER |
| 6 | 14853 | 37 | INDIA | CANCER |
| 7 | 14850 | 36 | JAPAN | CANCER |
| 8 | 14850 | 35 | USA | CANCER |

QUASI-IDENTIFIER | SENSITIVE DATA

Fig. 1B RELATED ART

| # | ZIP | AGE | NATIONALITY | SYMPTOM |
|---|---|---|---|---|
| 1 | 130** | 2* | * | HEART DISEASE |
| 2 | 130** | 2* | * | HEART DISEASE |
| 3 | 130** | 2* | * | INFECTION |
| 4 | 130** | 2* | * | INFECTION |
| 5 | 148** | 3* | * | CANCER |
| 6 | 148** | 3* | * | CANCER |
| 7 | 148** | 3* | * | CANCER |
| 8 | 148** | 3* | * | CANCER |

$k=4$ (rows 1–4, 5–8); $l=2$ (rows 1–4), $l=1$ (rows 5–8)

| USER NAME | POSITION | POSITION MEASUREMENT TIME |
|---|---|---|
| USER A | LATITUDE a1, LONGITUDE a1 | 6/1 10:00 |
| USER B | LATITUDE b1, LONGITUDE b1 | 6/1 10:00 |
| USER C | LATITUDE c1, LONGITUDE c1 | 6/1 10:00 |
| USER D | LATITUDE d1, LONGITUDE d1 | 6/1 10:00 |
| USER A | LATITUDE a2, LONGITUDE a2 | 6/1 11:00 |
| USER B | LATITUDE b2, LONGITUDE b2 | 6/1 11:00 |
| USER C | LATITUDE c2, LONGITUDE c2 | 6/1 11:00 |
| USER D | LATITUDE d2, LONGITUDE d2 | 6/1 11:00 |
| ⋮ | ⋮ | ⋮ |

| PRIORITY | ABSTRACTION SCHEME |
|---|---|
| 1 | DO NOTHING |
| 2 | EXTEND TO RANGE OF 300M |
| 3 | EXTEND TO RANGE OF 500M |
| 4 | DELETE POSITION DATA |
| ⋮ | ⋮ |

| USER NAME | POSITION | POSITION MEASUREMENT TIME |
|---|---|---|
| USER A | WITHIN CIRCLE OF 500M AROUND POSITION A1 | POSITION MEASUREMENT TIME OF POSITION A1 (6/1 10:00) |
| USER B | WITHIN CIRCLE OF 500M AROUND POSITION A1 | POSITION MEASUREMENT TIME OF POSITION B1 (6/1 10:00) |
| USER C | WITHIN CIRCLE OF 500M AROUND POSITION A1 | POSITION MEASUREMENT TIME OF POSITION C1 (6/1 10:00) |
| USER D | WITHIN CIRCLE OF 500M AROUND POSITION A2 | POSITION MEASUREMENT TIME OF POSITION D1 (6/1 10:00) |
| USER A | WITHIN CIRCLE OF 500M AROUND POSITION A2 | POSITION MEASUREMENT TIME OF POSITION A2 (6/1 11:00) |
| USER B | WITHIN CIRCLE OF 500M AROUND POSITION A2 | POSITION MEASUREMENT TIME OF POSITION B2 (6/1 11:00) |
| USER C | WITHIN CIRCLE OF 300M AROUND POSITION C2 | POSITION MEASUREMENT TIME OF POSITION C2 (6/1 11:00) |
| USER D | WITHIN CIRCLE OF 300M AROUND POSITION C2 | POSITION MEASUREMENT TIME OF POSITION D2 (6/1 11:00) |

Fig. 23

| USER NAME | POSITION | POSITION MEASUREMENT TIME |
|---|---|---|
| USER A | WITHIN CIRCLE OF 500M AROUND POSITION A1 | POSITION MEASUREMENT TIME OF POSITION A1 (6/1 10:00) |
| USER B | WITHIN CIRCLE OF 500M AROUND POSITION A1 | POSITION MEASUREMENT TIME OF POSITION B1 (6/1 10:00) |
| ... | ... | ... |
| USER A | WITHIN CIRCLE OF 500M AROUND POSITION A2 | POSITION MEASUREMENT TIME OF POSITION A2 (6/1 11:00) |
| USER B | WITHIN CIRCLE OF 500M AROUND POSITION A2 | POSITION MEASUREMENT TIME OF POSITION B2 (6/1 11:00) |
| ... | ... | ... |
| USER A | WITHIN CIRCLE OF 500M AROUND POSITION A3 | POSITION MEASUREMENT TIME OF POSITION A3 (6/1 12:00) |
| USER B | WITHIN CIRCLE OF 500M AROUND POSITION A3 | POSITION MEASUREMENT TIME OF POSITION B3 (6/1 12:00) |
| ... | ... | ... |

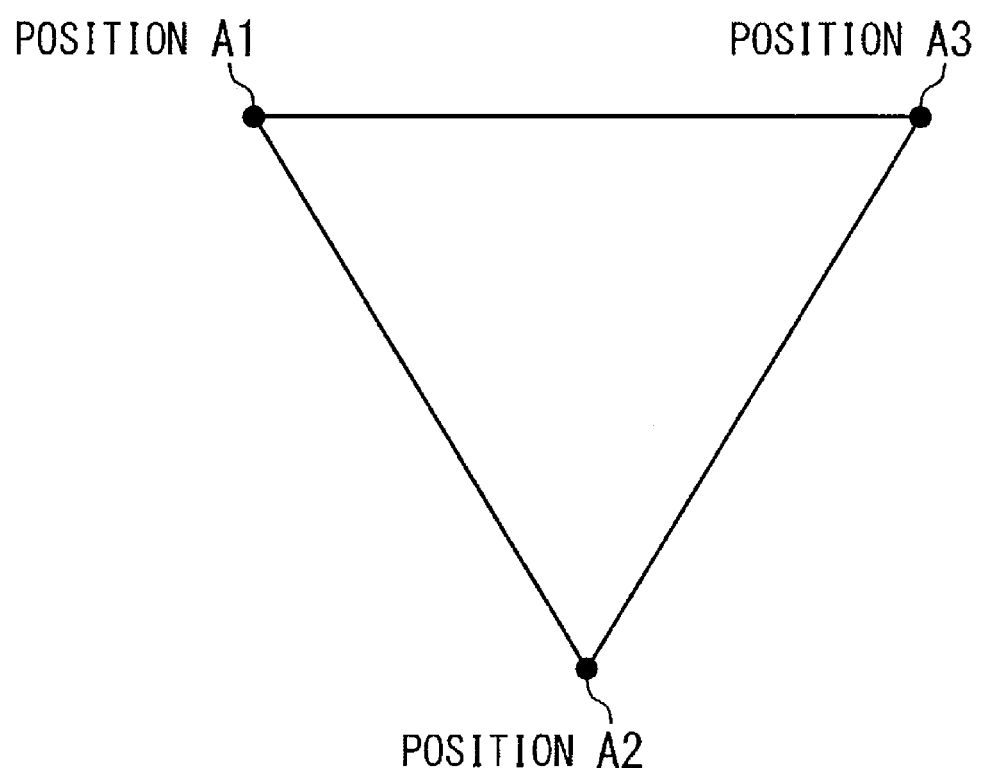

INFORMATION MANAGEMENT APPARATUS, DATA PROCESSING METHOD AND COMPUTER PROGRAM

CROSS REFERENCE TO RELATED APPLICATIONS

This application is a National Stage of International Application No. PCT/JP2010/067646 filed Oct. 7, 2010claiming priority based on Japanese Patent Application No. 2009-234897 filed Oct. 9, 2009, the contents of all of which are incorporated herein by reference in their entirety.

TECHNICAL FIELD

The present invention is related to an information management apparatus, a data processing method and a computer program, and more particularly to an information management apparatus, a data processing method and a computer program which manages position data.

BACKGROUND ART

In recent years, the service utilizing the position data measured by GPS (Global Positioning System) mounted on a mobile terminal, a car and so on and wireless LAN (Local Area Network) and so on is increasing. There is a possibility that the position data is data which specifies an individual (of a user of the mobile terminal, the car and so on) at a home, in a working place, at a school and so on, and allows contact with the user, or data which the user does not want to be known by a stranger such as hobbies and diversions, hospital visit, and so on, and the position data is high-level privacy data. Such privacy data is anonymized, to secure the anonymity.

Here, the anonymization is processing to process the privacy data so as for the user not to be able to be specified. An index showing what degree a user cannot be specified is called an anonymity index. The existing index as the anonymity index is k-anonymity or l-diversity. Hereinafter, it is supposed that the user data is composed of an anonymous index as the one which is composed of one or more quasi-identifiers which identify the users and one or more sensitive data. First, the k-anonymity is an index to guarantee that a same quasi-identifier becomes k or more quasi-identifiers through anonymization of the quasi-identifier. By satisfying k-anonymity, a user is not specified to one. On the other hand, the l-diversity is an index to guarantee that sensitive data of the same quasi-identifier becomes one or more quasi-identifiers through with the anonymization of the quasi-identifier. It is possible to prevent that the sensitive data of the user is known, by satisfying the l-diversity.

For example, it is supposed that there is the disease condition record of a patient shown in FIG. 1A as an example. In the disease condition record shown in FIG. 1A, ZIP code, an age, and a nationality are recorded as the quasi-identifier, and a disease condition is recorded as the sensitive data. In case of the ZIP code and the age, the anonymization is carried out by turning down an optional field, and in case of the nationality, the anonymization is carried out by turning down a name of the country. FIG. 1B shows an example when a disease condition record shown in FIG. 1A is anonymized. By anonymizing the ZIP code, the age, the nationality, two groups are formed to have an identical quasi-identifier. "k" of the k-anonymous is the number of uses of the group, and k=4 in this example in any case. It becomes not possible to specify a user corresponding to a line by guaranteeing k≥2. "l" of the l-anonymous is the number of disease conditions of the group, and l=2 in the group to which the users 1 to 4 belongs, and l=1 in the group to which the users 5 to 8 belongs. When a viewer that a user of 30 eras and having the ZIP code is 148** visits a hospital sees this table (FIG. 1B), it is known to the viewer that the user is "a cancer". However, even if the viewer knows the user, it is possible to prevent that the viewer further know the feature of the user (disease condition in this example), by guaranteeing l≥2 (the users 1 to 4). As the well-known anonymity index, there are t-approximation and m-invariance but their descriptions are omitted.

The position data periodically measured by a mobile terminal, a car and so on depends on the data, in nature. For example, there is a possibility that the position data is data by which an individual at a home or in a working place is specified, and there is a possibility that the position data is data which clarifies the feature of the individual, such as a place specifying the hobby and diversion and at a hospital to be visited. However, it is difficult to know such a nature in single position data, but there are many cases that the nature can be clarified, by analyzing a plurality of position data of a same user, and by inspecting a place which the user stays for a long time every day. Therefore, each position data of a position history (a plurality of position data of the same user) is a quasi-identifier, and sensitive data.

Regarding the anonymization of the position data, the single position data can be data by which a viewer who is in the "place" can specify a user. When the position data of the user is viewed after the user has been specified, where the user goes is known. Therefore, it is necessary to prevent the user from being specified by guaranteeing the k-anonymity in case of the single position data. FIG. 2 is a conceptual diagram showing an example of the anonymization of the single position data. Here, an example of anonymizing (abstracting) the position data of the user 1 to the user 4 to meet the k-anonymity (k≥4) is shown. In FIG. 2, a black point is position data of each user shown with latitude and longitude and a gray circle shows an area. It is possible to make it difficult for the viewer who was in the "place" to specify all the users, by converting the position data of each user into the area data in which four users are contained.

In relation to the above technique, Patent Literatures 1 and 2 show examples of a system of anonymizing data as the technique which uses privacy data to service while securing the anonymity of the privacy data.

The privacy data management server of Patent Literature 1 (JP 2005-234866A) manages the privacy data of a terminal user in a network connecting between a plurality of terminals for communication. The privacy data management server is provided with a privacy data database which stores the privacy data of the user, a privacy data management section of managing the privacy data in the privacy data database, and a statistic processing section of calculating a rate of the users who are specified from a kind of the privacy data, to a total of users registered on in the said privacy data database. When receiving a request message of the privacy data of the user from a terminal, the privacy data management section searches the privacy data database. The statistic processing section calculates a rate of the users who have the privacy data to the registered users, when the privacy data is searched, and transmits the privacy data to the terminal when the searched privacy data is more than a threshold value.

Also, a data disclosure apparatus disclosed in Patent Literature 2 (JP 2007-219636A) manages data containing privacy data. The data disclosure apparatus is provided with a retaining section of retaining one or more data, each of which is composed of one or more attributes, an anonymity calculation section of calculating the anonymity when disclosing the attribute of a characteristic of the data, and a grain size change disclosure section which changes a grain size of the data of a specific attribute such that the data has the anonymity higher than a desired threshold value, when the calculated anonymity has not a desired anonymity, and discloses the data of the attribute.

Also, as a related technique, in a method of using presence data disclosed in Patent Literature 3 (JP 2005-031965A), a data user side terminal apparatus uses presence data disclosed by a data provider side terminal apparatus through a communication network under a service control by a server apparatus. In this method of using the presence data, the data user side terminal apparatus executes the following steps: a data collection request step of requesting collection of presence data to a server apparatus; a presence data reception step of transmitting advertisement and guidance of a data provider recruiting to the data provider side terminal apparatus by the server apparatus, carrying out application reception and contract in cooperation with the data provider side terminal apparatus, and receiving the presence data generated from the contents of the contraction and presence object data from the data provider side terminal apparatus; a statistic processing or presence data storage step of carrying out statistic processing or accumulation of the generated presence data; and a charge data storage step of storing charge data to the statistically processed presence data to support a disbursement with reward.

Also, a data service system disclosed in Patent Literature 4 (JP 2004-029940A) is provided with a first data processing apparatus connected with a network to manage data; a second data processing apparatus which provides the data for the first data processing apparatus; and a third data processing apparatus which acquires the data from the first data processing apparatus. In this data service system, the first data processing apparatus is provided with a neighborhood data acquisition section of acquiring circumference data of the neighborhood of the second data processing apparatus which data is supplied from the second data processing apparatus; an statistic data generation section of generating statistic data from the neighborhood data acquired by the neighborhood data acquisition section; a request receiving section of receiving a request of the neighborhood data from the third data processing apparatus; and a neighborhood data supplying section of supplying the neighborhood data generated by the neighborhood data generation section to the third data processing apparatus based on the request received by the request receiving section. The second data processing apparatus is provided with a neighborhood data collection section of collecting the neighborhood data; a neighborhood data supplying section of supplying the neighborhood data collected by the neighborhood data collection section to the first data processing apparatus; and a supply control section which controls the supply of the neighborhood data by the neighborhood data supplying section. The third data processing apparatus is provided with a neighborhood data request section of requesting the neighborhood data and a neighborhood data acquisition section of acquiring the neighborhood data requested by the neighborhood data request section.

Also, a data service apparatus according to Patent Literature 5 (JP 2004-318391A) is communicable with an access apparatus through a network and provides data to the access apparatus based on a request from the access apparatus. The data service apparatus is provided with an individual data storage section which stores individual data of an individual, a receiving section which receives an individual data transmission request containing a searches condition of the individual data from the access apparatus; a search condition confirmation section which confirms the search condition contained in the individual data transmission request received by the receiving section, deletes a condition possible to specify the individual when the condition possible to specify the individual is contained in the search condition contained in the individual data transmission request, outputs the search condition in which the condition possible to specify the individual is deleted as a search condition after the confirmation, and outputs the search condition contained in the individual data transmission request just as it is as the search condition after the confirmation, When the condition possible to specify the individual is not contained in the search condition contained in the individual data transmission request; an individual data extracting section which inputs the search condition after the confirmation outputted from the search condition confirmation section and searches the individual data storage section based on the search condition after the confirmation to extract individual data; a data ID generating section which generates a data identification to identify the extracted individual data by using the individual data extracted by the individual data extracting section based on a predetermined rule, and assigns the generated data identification to the extracted individual data; and a search result determination section which determines whether or not it is possible to specify an individual from the individual data assigned with the data ID and extracted by the individual data extracting section based on the predetermined rule, and transmits the individual data assigned with the data ID to the access apparatus when determining that it is impossible to specify the individual.

Also, a data mediation apparatus disclosed in Patent Literature 6 (JP 2005-346248A) is provided with a first data storage section which stores individual specifying data specifying an individual and containing a mail address and diagnosis result data of the individual; an anonymization section which refers to the first data storage section to exclude predetermined data containing a name from the individual specifying data, and stores the remaining individual specifying data and at least a part of the diagnosis result data in a second data storage section as anonymization individual data; a section which allows access to the anonymization individual data stored in the second data storage section from a terminal of a registered provider; a section which identifies the individuals belonging to each of a plurality of classifications prescribed based on data classification in the anonymization individual data stored in the second data storage section by using the data stored in the first data storage section and stores the identification data of the individual belonging to each of the plurality of classifications in a third data storage section; and a section which receives an advertisement mail to each of the plurality of classifications contained in the third data storage section from the registration undertaker, and transfers the advertisement mail to the mail address stored in the first data storage section by using the identification data of a belonging individual stored in the third data storage section.

Also, an anonymization identification data generating system disclosed in Patent Literature 7 (JP 2007-179500A) is provided with a data acquisition section which acquires subject identification data peculiar to every subject of an object for genetic data to be analyzed, and subject relation data showing relation among subjects; an identification data coding section which codes the subject identification data acquired by the data acquisition section and generates coded identification data; a coding data generation section which generates coding data based on the coding identification data generated by the identification data coding section and the subject relation data acquired by the data acquisition section;

and a coding data transmission section which transmits to another apparatus for analysis.

CITATION LIST

[Patent Literature 1] JP 2005-234866A
[Patent Literature 2] JP 2007-219636A
[Patent Literature 3] JP 2005-031965A
[Patent Literature 4] JP 2004-029940A
[Patent Literature 5] JP 2004-318391A
[Patent Literature 6] JP 2005-346248A
[Patent Literature 7] JP 2007-179500A

SUMMARY OF THE INVENTION

In the technique for the anonymization described with reference to FIG. 2, the technique is effective to the single position data, but it is not always possible that position history of a plurality of position data is effective. For example, it is because the data is necessary in order that a viewer who knows that a user was in some place knows where the user went.

In the system disclosed in Patent Literature 1, when trying to anonymize the privacy data having less overlapping little like the position data shown with the latitude and the longitude, almost of the privacy data would not satisfy the threshold value. Therefore, such privacy data can be hardly transmitted outside (it is not possible to use for the service).

In the system disclosed in Patent Literature 2, when the action history which is composed of a plurality of position data is dealt with, it is considered that a user cannot be specified from the action history because the position data is anonymized such that the number of users who take the same action is equal to or more than a predetermined number. However, there is a possibility that it is known to the viewer who knows a part of the action history of the user that the user went to a different position.

The present invention is made in view of the above mentioned problems, and an object of the present invention is to provide a data management apparatus, a data processing method, a data management system and a computer program which it becomes more difficult that a viewer who knows a part of action of a user knows an action of the user newly, when using privacy data for a service while securing anonymity.

To solve the above problem, the information management apparatus of the present invention is provided with a data receiving section, a user data storage section, a first extracting section, a processing section, an abstraction scheme storage section, an abstracting section and a testing section. The data receiving section receives position data periodically from each of a plurality of mobile terminals. Here, the position data contains position measurement data showing a position of the mobile terminal, position measurement time of the position measurement data and accompaniment data having identification data of a user of the mobile terminal. The user data storage section stores the position data received by the data receiving section as action history every user. The first extracting section generates a node composed of the identification data of the user of the position data and object data, by using each of the position data of the action history stored in the user data storage section as the object data. The processing section registers on the node, a movement data set having as an element, at least one of the position data showing a position before movement to a position shown by the object data and the position data showing a position after the movement from the position shown by the object data, with respect to the object data contained in the node. The abstraction scheme storage section stores an abstraction scheme to the position data. The abstracting section applies the abstraction scheme stored in the abstraction scheme storage section to the object data of the node. The testing section extracts other nodes, each of which has identification data different from that of the user of the node, which has the object data abstracted by the abstracting section, and object data of a same position as a position of the object data of the node or a position contained in a position of the object data of the node, and each of which has a movement data set with which a product set of the movement data set of the node is an empty set, and outputs the object data of the node as anonymity data when the number of other nodes is equal to or more than a predetermined threshold value.

Also, the information management apparatus of the present invention is provided with a data receiving section, a user data storage section, a second extracting section, a processing section, an abstraction scheme storage section, an abstracting section and the testing section. The data receiving section receives position data periodically from a plurality of mobile terminals. Here, the position data contains position measurement data showing a position of each of the plurality of mobile terminals, position measurement time of the position measurement data, and accompaniment data having identification data of a user of the mobile terminal. The user data storage section stores the position data received by the data receiving section as action history every user. The second extracting section generates a power set to at least one position data of action history stored in the user data storage section, and generates a node composed of identification data of the user of the position data and object data by using each element of the power set as the object data. The processing section registers on the node, a movement data set having as an element, at least one of the position data showing a position before movement to a position shown by the object data and the position data showing a position after the movement from the position shown by the object data, with respect to the object data contained in the node. The abstraction scheme storage section stores an abstraction scheme to the position data. The abstracting section applies the abstraction scheme stored in the abstraction scheme storage section to the object data of the node. The testing section extracts other nodes, each of which has identification data different from that of the user of the node, which has the object data abstracted by the abstracting section, and object data of a same position as a position of the object data of the node or a position contained in a position of the object data of the node, and each of which has a movement data set with which a product set of the movement data set of the node is an empty set, and outputs the object data of the node as anonymity data when the number of other nodes is equal to or more than a predetermined threshold value.

Also, a data processing method of an information management apparatus of the present invention includes receiving the position data periodically from the mobile terminal; generating a node composed of the identification data of the user of the position data and object data, by using each of the position data of the action history stored in the user data storage section as the object data; registering on the node, a movement data set having as an element, at least one of the position data showing a position before movement to a position shown by the object data and the position data showing a position after the movement from the position shown by the object data, with respect to the object data contained in the node; applying the abstraction scheme stored in the abstraction scheme storage section to the object data of the node; and extracting other nodes, each of which has identification data different from that of the user of the node, which has the object data abstracted by the abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value. The information management apparatus includes a user data storage section which stores position data received from each of a plurality of mobile terminals as action history every user, wherein the position data contains position measurement data showing a position of the mobile terminal and accompaniment data composed of measurement time of the position measurement data and identification data of a user of the mobile terminal, and a abstraction scheme storage section which stores an abstraction scheme of the position data.

Also, a data processing method of an information management apparatus of the present invention includes receiving position data periodically from the mobile terminal; generating a power set to at least one position data of action history stored in the user data storage section, and generating a node composed of identification data of the user of the position data and object data by using each element of the power set as the object data; registering on the node, a movement data set having as an element, at least one of the position data showing a position before movement to a position shown by the object data and the position data showing a position after the movement from the position shown by the object data, with respect to the object data contained in the node; applying the abstraction scheme stored in the abstraction scheme storage section to the object data of the node; and extracting other nodes, each of which has identification data different from that of the user of the node, which has the object data abstracted by the abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value. The information management apparatus includes a user data storage section which stores position data received from each of a plurality of mobile terminals as action history every user, wherein the position data contains position measurement data showing a position of the mobile terminal and accompaniment data composed of measurement time of the position measurement data and identification data of a user of the mobile terminal, and a abstraction scheme storage section which stores an abstraction scheme of the position data.

Also, a program for making a computer execute a data processing method of an information management apparatus of the present invention, in which the data processing method includes: receiving the position data periodically from the mobile terminal; generating a node composed of the identification data of the user of the position data and object data, by using each of the position data of the action history stored in the user data storage section as the object data; registering on the node, a movement data set having as an element, at least one of the position data showing a position before movement to a position shown by the object data and the position data showing a position after the movement from the position shown by the object data, with respect to the object data contained in the node; applying the abstraction scheme stored in the abstraction scheme storage section to the object data of the node; and extracting other nodes, each of which has identification data different from that of the user of the node, which has the object data abstracted by the abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value. The information management apparatus includes a user data storage section which stores position data received from each of a plurality of mobile terminals as action history every user, wherein the position data contains position measurement data showing a position of the mobile terminal and accompaniment data composed of measurement time of the position measurement data and identification data of a user of the mobile terminal, and a abstraction scheme storage section which stores an abstraction scheme of the position data.

Also, a program for making a computer execute a data processing method of an information management apparatus of the present invention, in which the data processing method includes: receiving position data periodically from the mobile terminal; generating a power set to at least one position data of action history stored in the user data storage section, and generating a node composed of identification data of the user of the position data and object data by using each element of the power set as the object data; registering on the node, a movement data set having as an element, at least one of the position data showing a position before movement to a position shown by the object data and the position data showing a position after the movement from the position shown by the object data, with respect to the object data contained in the node; applying the abstraction scheme stored in the abstraction scheme storage section to the object data of the node; and extracting other nodes, each of which has identification data different from that of the user of the node, which has the object data abstracted by the abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value. The information management apparatus includes a user data storage section which stores position data received from each of a plurality of mobile terminals as action history every user, wherein the position data contains position measurement data showing a position of the mobile terminal and accompaniment data composed of measurement time of the position measurement data and identification data of a user of the mobile terminal, and a abstraction scheme storage section which stores an abstraction scheme of the position data.

BRIEF DESCRIPTION OF THE DRAWINGS

FIG. 1A are a table showing an example of data (before anonymization) to show an anonymous index;

FIG. 1B is a table showing an example of data (after anonymization) to show the anonymous index;

FIG. 16 is a table showing an example of an abstraction scheme storage section in the information management apparatus according to the implementation example of the present invention;

FIG. 19 is the table showing an example of an anonymity data storage section in the information management apparatus according to the implementation example of the present invention;

FIG. 23 is a table showing an example of an anonymity data storage section in the information management apparatus according to the implementation example of the present invention;

FIG. 24 is a diagram showing the processing of the information management apparatus according to the implementation example of the present invention;

DESCRIPTION OF EXEMPLARY EMBODIMENTS

Figure 2:
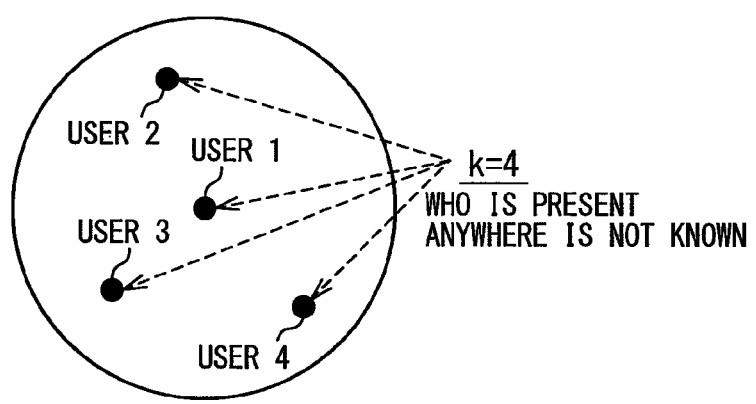
FIG. 2 is a conceptual diagram showing an example of the anonymization of the single position data.

Hereinafter, an information management apparatus, data processing method and computer program according to exemplary embodiments of the present invention will be described with reference to the attached drawings. The configuration of a portion which does not relate to the essence of the present invention in the drawings is omitted and is not illustrated.

[First Exemplary Embodiment]

Figure 3:
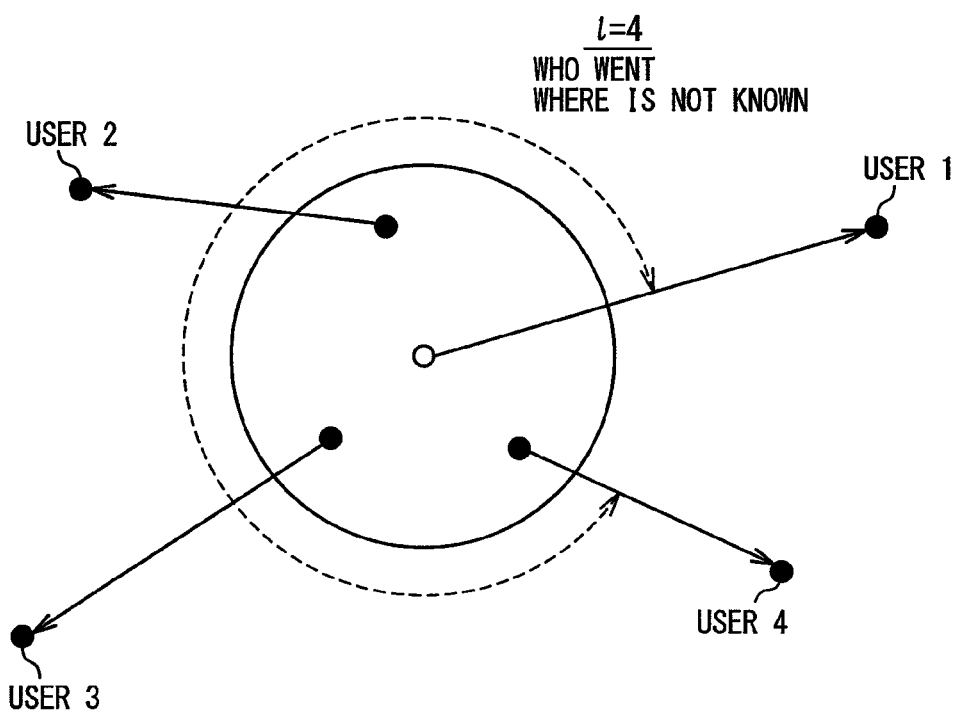
FIG. 3 is a conceptual diagram showing an example of the anonymization according to a first exemplary embodiment of the present invention.

First, anonymization in the information management apparatus according to a first exemplary embodiment of the present invention will be described. FIG. 3 is a conceptual diagram showing an example of the anonymization according to the first exemplary embodiment of the present invention. As mentioned above, because position history is composed of a plurality of position data, another position where a user went is known to a viewer who knows that a user stayed in a position from the position history. Therefore, in the present embodiment, the position history guarantees 1 diversity which prevents the viewer form knowing the position data which the viewer does not know. FIG. 3 is an example in which the position histories of user 1 to user 4 are anonymized (abstracted) to satisfy l diversity (l=4). Here, in FIG. 3, each point shows position data showing a position where a user stayed in latitude and longitude and an arrow linking a point and another point shows that the user moved from the origin of the arrow to the end of the arrow. Also, a circle shows an area. In this example, the center of the area is abstracted to provide l destination candidates such that the viewer cannot know where the user 1 goes, even when the viewer who knows that the user 1 stays in a center of the area (the center point of the circle) views the position history. By increasing l (improving l diversity), the anonymity can be improved. This diversification improves diversity regarding one position. From this, such diversity can be called SDLD (Single-Dimensional l-Diversity). In the first exemplary embodiment, a plurality of position data (position history) are diversified such that the 1-dimensional l-diversity meets predetermined condition. Hereinafter, the first exemplary embodiment of the present invention will be described in detail.

Figure 4:
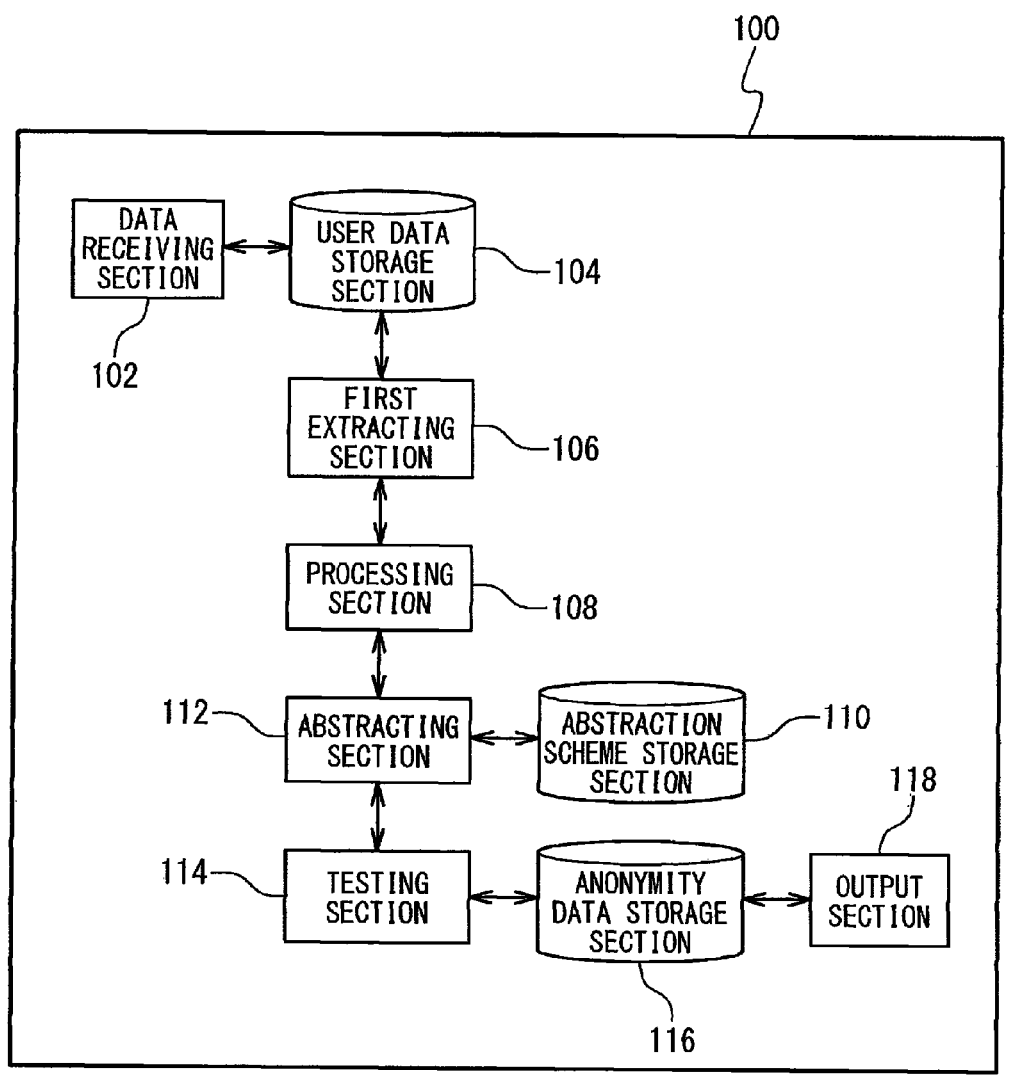
FIG. 4 is a functional block diagram showing a configuration of an information management apparatus according to the first exemplary embodiment of the present invention.

First, the configuration of the information management apparatus 100 according to the first exemplary embodiment of the present invention will be described. FIG. 4 is a functional block diagram showing the configuration of the information management apparatus 100 according to the first exemplary embodiment of the present invention. The information management apparatus 100 is provided with a data receiving section 102, a user data storage section 104, a first extracting section 106, a processing section 108, an abstraction scheme storage section 110, an abstracting section 112, a testing section 114, an anonymity data storage section 116, and an output section 118.

The information management apparatus 100 is an information processing apparatus which is exemplified by a computer. Each component (a functional block) of the information management apparatus 100 and other information management apparatuses to be described later are realized by using a program (software) which realizes the components in FIG. 4 and so on by a hardware configuration of the information processing apparatus. For example, the present invention is realized by executing data calculation processing for the purpose of each component through cooperation of a hardware configuration of the computer such as a CPU (Central Processing Unit), a memory, and a storage unit and a program (software) realizing the components of FIG. 4, stored in the storage unit, and loaded into the memory. A skilled person in the art knows that there are various modification examples of the realizing method and apparatus. Hereinafter, each drawing to be described below shows not the hardware configuration but a block in units of the functions.

Such an information management apparatus 100 can be realized by, for example, a computer which is provided with, a CPU, a memory (main memory unit), a hard disk unit (auxiliary storage unit), and a communication unit, and is connected with an input unit such as a keyboard and a mouse and an output unit such as a display, a printer and so on. The CPU the functions of the data receiving section 102 to the output section 118 can be realized by the CPU reading the program from the hard disk into the memory and executing it.

The data receiving section 102 is connected with a plurality of terminal equipments through a network. Each terminal equipment is carried by a user. The mobile terminal loads with a position measuring unit such as GPS and a wireless LAN. The data receiving section 102 receives position data from the terminal equipment appropriately (ex: periodically, every set time, or in response to a button operation by the user, and so on). The position data is composed of position measurement data and accompaniment data, and is generated by the position measuring unit. Here, the position measurement data shows a position in a combination of latitude, longitude and altitude and so on. The accompaniment data shows a position measuring time and user data such as a user name and a user ID (or a mobile terminal ID). It should be noted that the position measurement data may be not only pin point data expressed with latitude, longitude and altitude and so on but also area data expressed by the area mesh code prescribed by the Ministry of Internal Affairs and Communications.

The user data storage section 104 records the position data transmitted from the user and continuously received by the data receiving section 102 as action history every user. That is, the user data storage section 104 relates the user name (or the user ID), the position measuring time and the position measurement data and stores as action history. It is desirable that the action history is stored in time series by using the position measuring time. However, if the first extracting section 106 can refer to the action history at high speed, the present invention is not limited to the example.

The first extracting section 106 generates a node composed of the user name of object data (single position data) and the object data by using as the object data, each of the position data of the action history which is stored in the user data storage section 104. The first extracting section 106 executes this processing to the action histories of all the users (that is, all the position data) which are registered in the user data storage section 104. That is, the nodes of the same number as the number of the position data are generated.

The processing section 108 uses as movement data, each of position data showing a position before movement to a position shown by the object data contained in the each node generated by the first extracting section 106, and the position data showing a position after movement from a position shown by the object data, and generates a movement data set of the movement data as elements and registers the movement data set on the node. The movement data may be single position data showing a position where a user stays actually before/after the time in relation to the object data or may be a set of position data showing the position(s) where the user stays possibly before/after the movement to/from the position shown by the object data. The position data may be either the position data before the time or the position data after the movement, and there may be no position data. In this case, the object data, the position data showing the position before the movement, and the position data showing the position after the movement are contained in the node.

The abstraction scheme storage section 110 stores an abstraction scheme for abstracting the position data and a priority. As an example of the abstraction scheme, time abstraction, user identifier deletion, position abstraction, position data partial deletion, and so on are thought of. Here, a part of year, month, day, time, minute and second of the time is deleted in the time abstraction. The identifier such as a user name (or a user ID) contained in a part of the position data is changed or deleted in the user identifier deletion. The area data such as the area mesh code and the position data shown with latitude and longitude are changed into data of a wide area data in the position abstraction. A part of the position data is deleted from the action history in the position data deletion. Also, a lower limit of the anonymity of data which can be provided from a data provider such as the user may be set or an upper limit of abstraction of the data which the viewer such as a service provider can utilize may be set. It is desirable that a manager of the abstraction scheme storage section 110 and so on can carry out management such as addition, deletion and change of the abstraction scheme. That is, the information management apparatus 100 is further provided with a managing section (not shown), and the managing section adjusts the contents of anonymity data based on the tendency of the position data which is stored in the user data storage section 104 and the precision of the anonymity data which is stored in the anonymity data storage section 116.

The abstracting section 112 applies the abstraction scheme stored in the abstraction scheme storage section 110, to the object data which is contained in each node in order of the priority. That is, the abstraction scheme of a priority 1 is first applied to the object data. Then, when the object data abstracted by the abstraction scheme does not pass the test of the testing section 114 to be described later, the abstraction scheme of a priority 2 is applied to the object data and receives the test by the testing section 114. Since then, the abstraction is carried out while lowering the priority until passing the test.

Here, in the abstraction scheme, the degree of the abstraction is lower as the priority is higher, and the degree of the abstraction is higher as the priority is lower. Therefore, the object data abstracted by the abstraction scheme with a higher priority become relatively near or same (focused) data to or as the original object data. On the other hand, the object data abstracted by the abstraction scheme with a lower priority become relatively far (blurred) data to the original object data. If seeing only single object data, the object data is abstracted as the abstraction scheme with a lower priority is used and has a higher anonymity. That is, the object data of the node is abstracted by the abstraction scheme of the abstracting section 112 more than the original position data and has a higher anonymity.

The testing section 114 lists up other nodes which contain object data which have user names different from the user name of the node to which an abstraction scheme is applied, and the same position as the object data of the node, and which configure a movement data set which forms an empty set as a product with the movement data set of the node. When the number of the other nodes is equal to or more than a threshold value, the object data of the node (position data abstracted by the abstraction scheme to be anonymized) is outputted as the anonymity data.

The anonymity data storage section 116 stores the anonymity data outputted from the testing section 114. The anonymity data is the object data of the node which passed the test by the testing section 114, and is the position data abstracted and anonymized by the abstraction scheme. That is, the anonymity data storage section 116 relates and stores the anonymized user name (or a user ID), the anonymized position measuring time and the anonymized position measurement data as the action history. Here, at least one of them should be anonymized.

The output section 118 receives a request from a requester (viewer) who uses the anonymity data (the position data anonymized by the abstraction) of a service provider which provides the service using the position data. The anonymity data (the position data anonymized by the abstraction) which satisfies the request is searched from the anonymity data storage section 116 and is transmitted to the requester (viewer).

Figure 5:
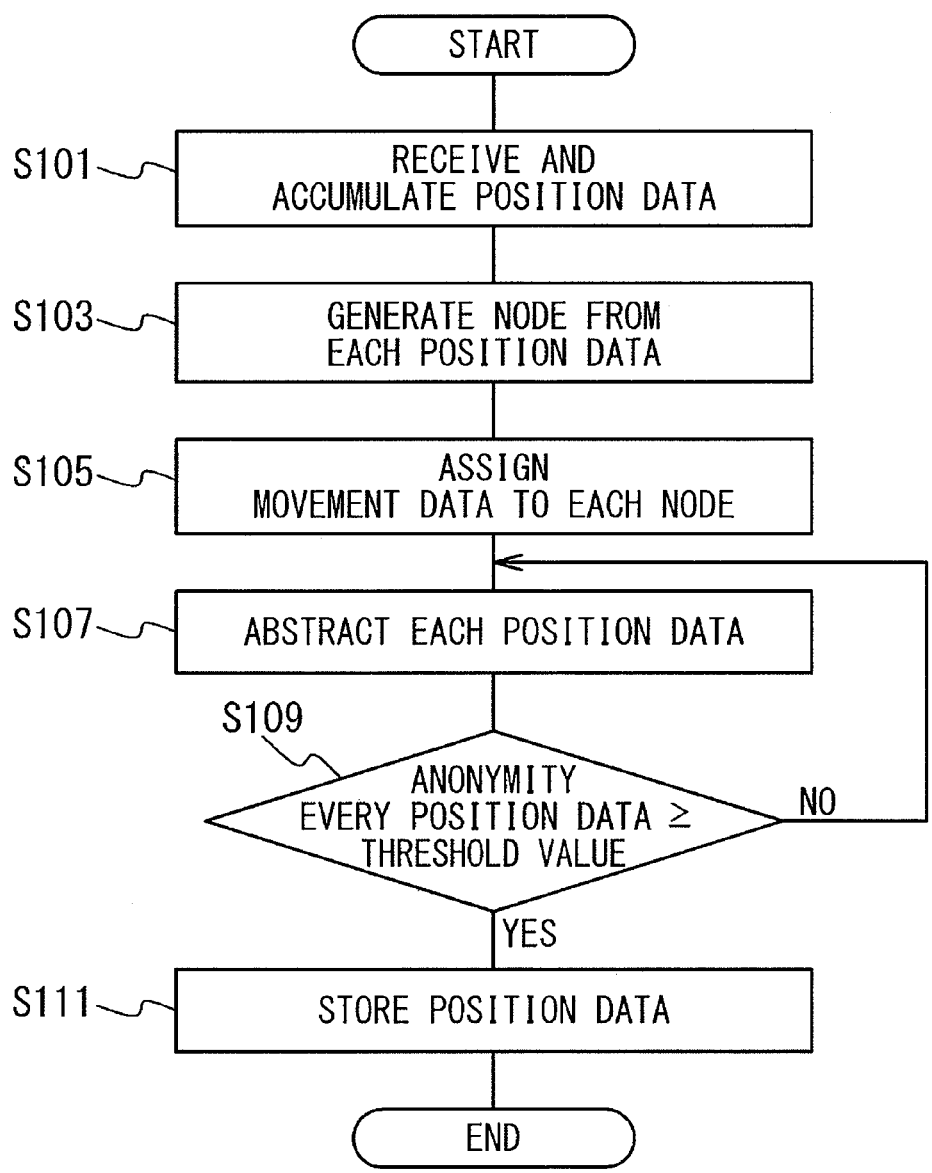
FIG. 5 is a flow chart showing an example of an operation (anonymization phase) of the information management apparatus according to the first exemplary embodiment of the present invention.
Figure 6:
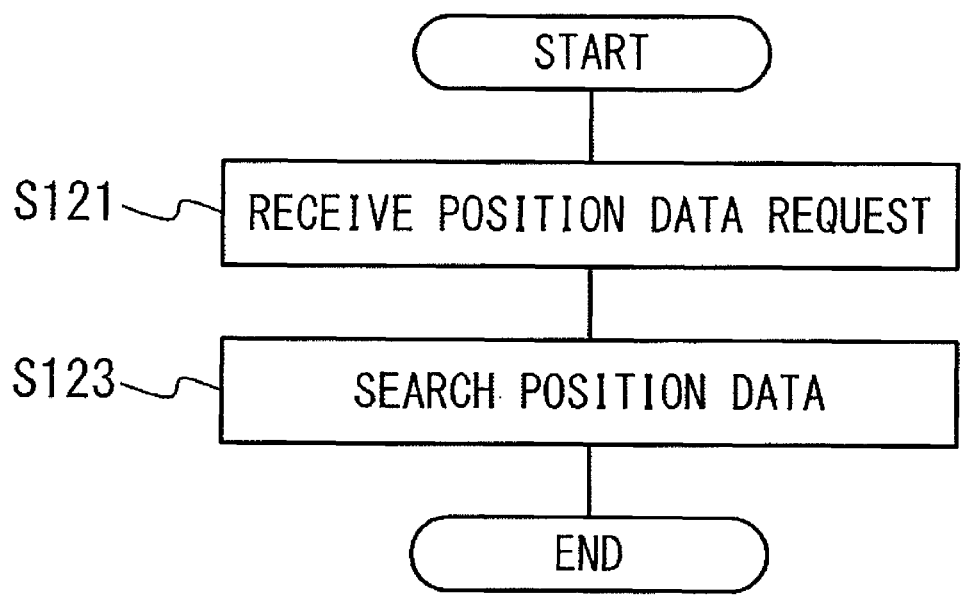
FIG. 6 is a flow chart showing an example of an operation (reference phase) of the information management apparatus according to the first, a second and a third exemplary embodiments of the present invention first.

Next, an operation the information management apparatus 100 according to the first exemplary embodiment of the present invention (data processing method) will be described. FIG. 5 and FIG. 6 are a flow chart showing an example of the operation of the information management apparatus 100 according to the first exemplary embodiment of the present invention. The operation of information management apparatus 100 contains an anonymization phase shown in FIG. 5 and a reference phase shown in FIG. 6. In this case, the anonymization phase contains a process of generating the anonymity data such that a user is not specified from the position data aggregated from the plurality of users. The reference phase contains a process of searching and providing the anonymity data which satisfies a request of the viewer.

First, the anonymization phase in FIG. 5 will be described. The data receiving section 102 receives periodically from a plurality of terminal equipments (the user), the position data composed of the position measurement data containing a combination of latitude, longitude, altitude, and so on, and accompaniment data such as a position measuring time and a symbol showing a user name. The position data transmitted from the users are aggregated and stored in the user data storage section 104 (user data storage unit) as the action history for every user (data receiving procedure: Step S101 in FIG. 5).

The first extracting section 106 uses each of the position data (that is, all the position data) of the action history stored in the user data storage section 104 as object data, and generates a node composed of a user name of the position data and the object data (first extraction procedure: Step S103 in FIG. 5).

The processing section 108 uses both of position data showing the position before the movement to the position shown by the object data contained in the node, and position data showing the position after the movement from the position shown by the object data, as movement data, generates a movement data set of one or more movement data as elements, and registers it to the node (processing procedure: Step S105 in FIG. 5).

The abstraction scheme storage section 110 (abstraction scheme storage unit) stores the abstraction scheme to the position data such as the time abstraction, the user identifier deletion, the abstraction of the position, and the position data deletion, and the priority in advance. The abstracting section 112 selects an abstraction scheme which is stored in the abstraction scheme storage section 110 and which has the highest priority but is not applied to the node, and applies the selected abstraction scheme to the object data of the node (abstraction procedure: Step S107 in FIG. 5). As a result, the object data of the node is abstracted higher than the original position data, to improve the anonymity, depending on the applied abstraction scheme.

The testing section 114 lists up other nodes containing object data which have user names different from the user name of the node, and have the same position as the position of the object data of the node, and having a movement data set, a product of which with the movement data set of the node is an empty set. That is, the listed nodes are nodes of different users who stayed in the same position as the user of the node and are the nodes of the users who stayed in different positions before/after the movement. Whether or not the number of other nodes is equal to or more than a threshold value is checked (Step S109 in FIG. 5). When the number of other nodes is equal to or more than the threshold value (Step S109: Yes in FIG. 5), the object data of the node (the position data abstracted and anonymized by the abstraction scheme) is outputted as the anonymity data, and the anonymity data (the position data anonymized by the abstraction) is stored in the anonymity data storage section 114 (anonymity data storage unit) (Step S111 in FIG. 5; test procedure: Step S109 to S111 in FIG. 5). Thus, the desired l diversity can be attained. Also, as a result, the desired k anonymity can be attained.

Next, the reference phase in FIG. 6 will be described. The output section 118 receives a request of information service for a predetermined condition from a requester (viewer) of the service provider which uses the anonymity data (position data anonymized by the abstraction) and so on (reception procedure: Step S121 in FIG. 6).

The output section 118 searches the contents of the anonymity data storage section 116 to extract the anonymity data (position data anonymized by the abstraction) which meets the predetermined condition, and outputs to the requester (viewer) (output procedure: Step S123 in FIG. 6).

In this way, according to the information management apparatus 100 in the present embodiment, the abstraction is carried out to each node (object data) to meet a predetermined test condition. That is, to some node, the abstraction is carried out such that the number of other nodes is equal to or more than the threshold value, wherein each of the other nodes has a user name different from that of the node, has the object data of the same position as the position of the object data of the node, and has a movement data set in which a product set with the movement data set of the node is an empty set. Therefore, the abstraction (anonymization) is carried out such that there is another user having position data which is same as the position data of an optional one of positions of the user but which is different from the position data other than the position data of the optional position. Thus, when the viewer who knows that the user stayed in some position (some node) in past tries to view the action history of an anonymized user, it is difficult to specify the user and to know other places where the user went, because the action history of the user cannot be distinguished from the anonymized action history of the other user who stayed in the same position. Thus, the action history can be anonymized such that the viewer cannot know a new action of the user, even if the viewer knew a part of the action history.

[Second Exemplary Embodiment]

Figure 7A:
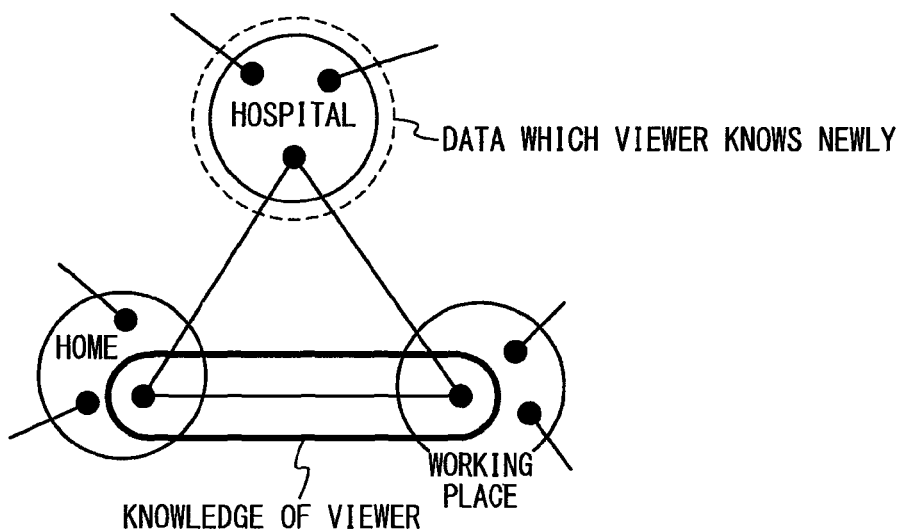
FIG. 7A is a conceptual diagram showing an example of the anonymization according to the second exemplary embodiment of the present invention.
Figure 7B:
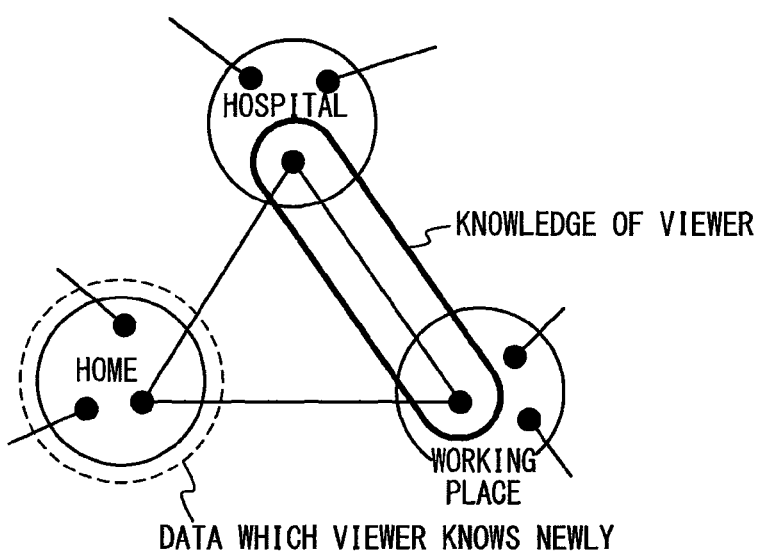
FIG. 7B is a conceptual diagram showing an example of the anonymization according to the second exemplary embodiment of the present invention.

First, the anonymization of the information management apparatus according to the second exemplary embodiment of the present invention will be described. FIG. 7A and FIG. 7B are a conceptual diagram showing an example of the anonymization according to the second exemplary embodiment of the present invention. In the first exemplary embodiment, even if the viewer who knew that the user stayed in some position in past tries to view the anonymized action history of the user, it is impossible to specify the anonymized user and to know other positions where the user went, because the anonymized action history cannot be distinguished from anonymized action history of another user who stayed in the same position as the some position. However, when the viewer knows that the user stayed in a plurality of positions in past, there is a case that it is difficult to anonymize the user and the position history to the viewer. For this reason, in the second exemplary embodiment, anonymization is executed such that the viewer who knows that the user stayed in the plurality of positions in past cannot know the position history of the user.

For example, it is supposed that an action range of a user is home, working place and a hospital, like an example of FIG. 7A and FIG. 7B. In this case, when the viewer knew the home and the working place as shown in FIG. 7A, there is a possibility that it is known to the viewer that the user went of a hospital when the user moves to an area containing the hospital, if only the user exists in both of an area containing the home and an area containing the working place is only one, even if anonymization (abstraction) is carried out to each of the home, the working place and the hospital to satisfy 1 diversity. Also, when the viewer knew the hospital and the working place as shown in FIG. 7B, there is a possibility that the home of the user is known to the viewer when the user who exists in both of the area containing the hospital and the area containing the working place is only one, and when the user moves to the area containing the home. In this way, in the second exemplary embodiment, the anonymization is carried out such that the viewer who knew that the user stayed in a plurality of positions in past, cannot know the position history of the user.

Figure 8:
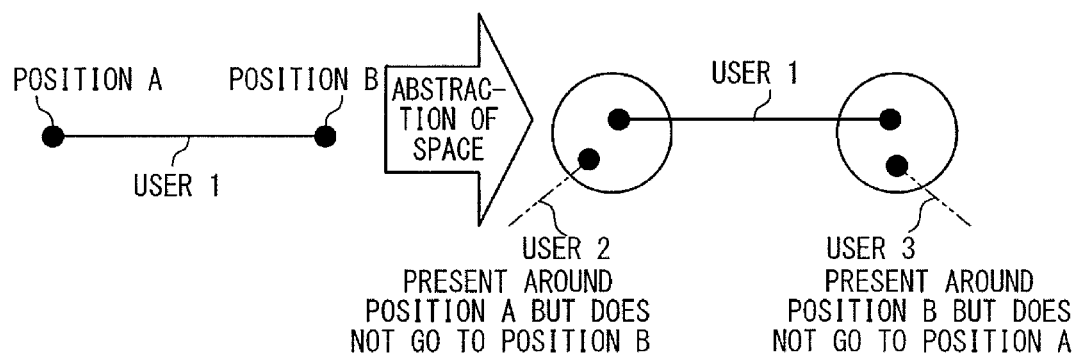
FIG. 8 is a conceptual diagram showing an example of the anonymization according to the second exemplary embodiment of the present invention.
Figure 9:
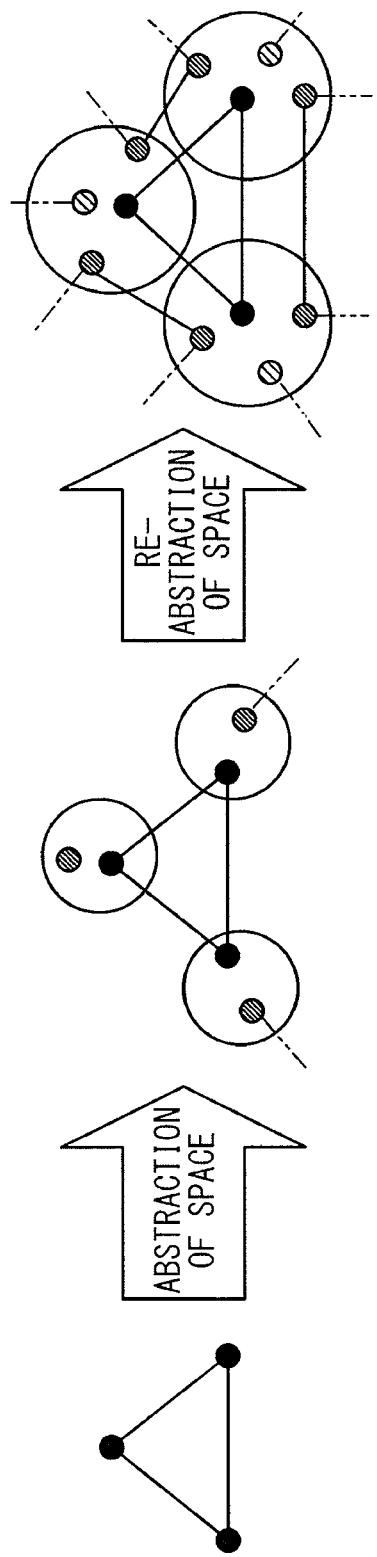
FIG. 9 is a conceptual diagram showing an example of the anonymization according to the second exemplary embodiment of the present invention.

In order to realize this, combinations of the position data which the viewer possibly knows are listed, and the position data is anonymized to meet 1 diversity to each combination. Specifically, a case that the position history of user 1 contains position data of 2 positions is shown in FIG. 8 and a case that it contains the position data of 3 positions is shown in FIG. 9. For example, in FIG. 8, when a position A and a position B are anonymized by abstracting the spaces of them, regarding the position A, an area containing the position A is formed to contain the user 2 who stays around the position A but does not go around the position B (abstracts the space). On the other hand, regarding the position B, an area containing the position B is formed to contain the user 3 who stays around the position B but does not go around the position A (abstracts the space). In this way, the space abstraction is not carried out independently by using only the data of the position but by referring to the data of positions and relating the data to each other. By this, even if it was known to the viewer that the user 1 stayed in the position A and the position B, where the user 1 goes is not known to the viewer due to the presence of the user 2 and the user 3. Also, for example, the same thing can be applied basically in case of FIG. 9. However, combinations of the position data which the viewer knows are three in case of knowing each of three positions and three in case of knowing every two of the three positions, resulting in six combinations totally. Therefore, first, in case of three combinations when each of the three positions is known, the spaces are abstracted like FIG. 8 (center of Figure). Moreover, then, in case of three combinations when two of the three positions are known, the space is further abstracted.

This diversification does not merely improve diversity in each of the plurality of positions but generates a possible combination of the plurality of positions and improves the diversity of each of the combinations. That is, multi-dimensional diversity is handled. Such diversity is called MDLD (Multi-Dimensional l-Diversity: the multidimensional l diversity). In the second exemplary embodiment, a plurality of position data (position history) is diversified to meet a predetermined condition of multi-dimensional l-diversity (MDLD) (diversity is improved). It is defined as follows that (hereinafter, referred to as MDLD guarantee) the predetermined condition of MDLD is met.

When there is n positions (nodes) (of the user) contained in the movement range (movement area to be described later) of the user, there are $2^n-1$ combinations as overlapping of the positions. The MDLD guarantee is to guarantee that at least one other user exists to meet each of $2^n-2$ combinations, excluding a case where all overlaps. For example, when the action of the user is composed of positions p1, p2, and p3, a movement area of the user is a range containing p1, p2, and p3, and the positions (of the user) contained in the movement area of the user is three. When overlapping with this action is expressed as a set of position, there are seven combinations such as ($2^3-1=7$) of {p1}, {p2}, {p3}, {p1, p2}, {p2, p3}, {p3, p1}, {p1, p2, p3}. The guarantee that at least one other user exists who satisfies the condition, in six combinations ($2^3-2=6$) excluding {p1, p2, p3} in which all overlap is MDLD guarantee (meet MDLD).

Hereinafter, the second exemplary embodiment of the present invention will be described in detail. It should be noted that there is a case that the description is omitted by assigning the same numerals or symbols in the figure, when there are configurations of the same function and operation as in the first exemplary embodiment. This is same in the other exemplary embodiments and examples.

Figure 10:
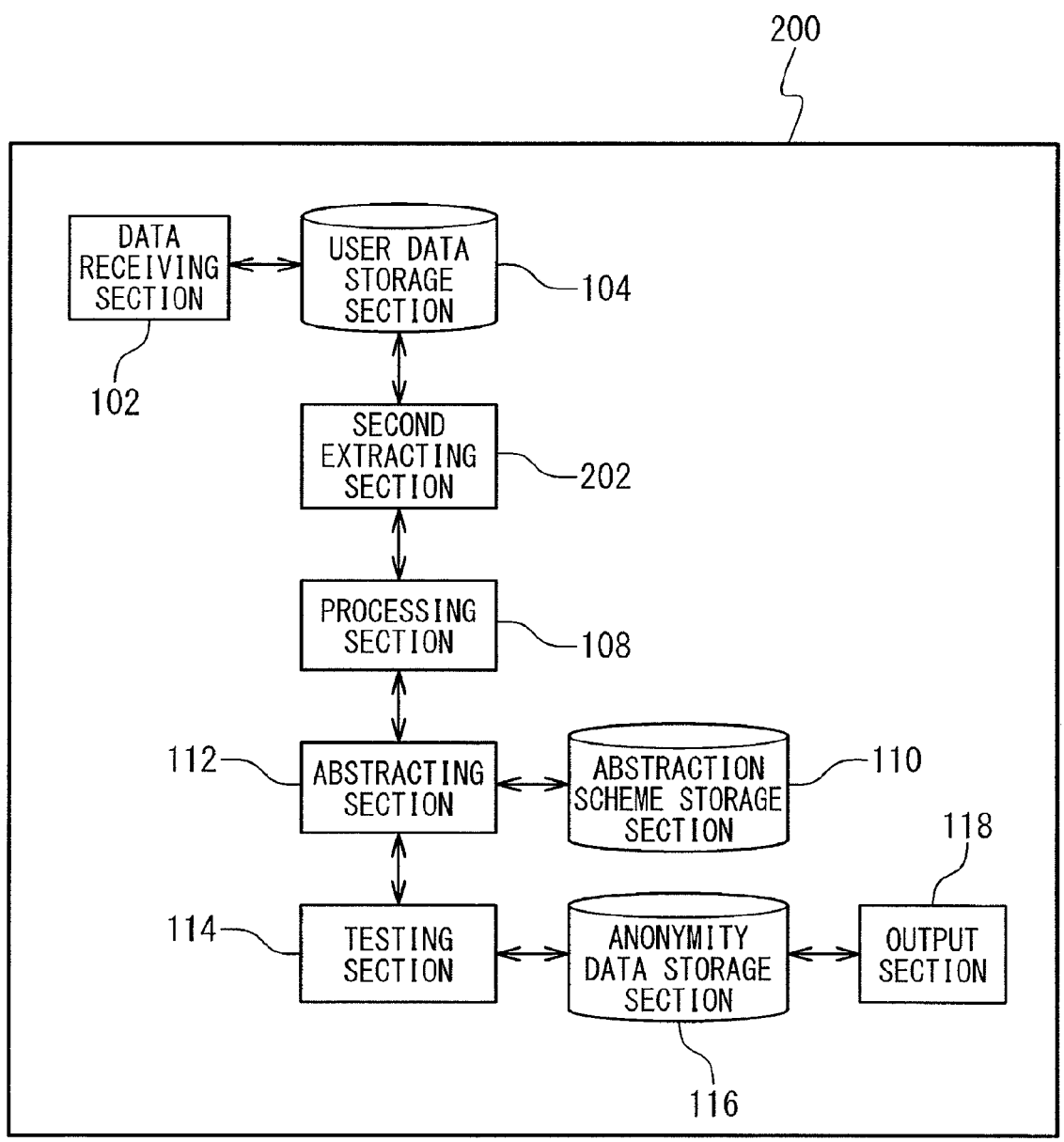
FIG. 10 is a functional block diagram showing a configuration of the information management apparatus according to the second exemplary embodiment of the present invention.

First, the configuration of the information management apparatus 200 according to the second exemplary embodiment of the present invention will be described. FIG. 10 is a functional block diagram showing the configuration of the information management apparatus 200 according to the second exemplary embodiment of the present invention. The information management apparatus 200 is provided with the data receiving section 102, the user data storage section 104, a second extracting section 202, the processing section 108, the abstraction scheme storage section 110, the abstracting section 112, the testing section 114, the anonymity data storage section 116, and the output section 118.

The information management apparatus 100 according to the first exemplary embodiment guarantees the diversity of the other positions with reference to one position by carrying out the anonymization processing for another user to exist in which the other user has one optional data which is same as position data of an optional position of the user and other position data which are different the position data other than the above position data. However, the information management apparatus 200 in the present exemplary embodiment differs from the information management apparatus 100 in that the diversity of the other position is guaranteed based on an optional combination of the position data of the user. The different configuration will be described below.

The information management apparatus 200 is provided with the second extracting section 202 instead of the first extracting section 106 in the configuration of the information management apparatus 100 according to the first exemplary embodiment. The second extracting section 202 generates an optional set of one or more position data of the action history every user which is stored in the user data storage section 104, and generates a node composed of the user name of the position data and the object data by using the set as the object data.

That is, the second extracting section 202 extracts an optional combination and generates a partial set by using the set of the position data every user which is stored in the user data storage section 104 as an original set. Specifically, the second extracting section 202 generates all combinations, i.e., a so-called set to the original set, as the partial set of a user. For example, seven partial sets ({A}, {B}, {C}, {A, B}, {A, C}, {B, C}, {A, B, C}) are generated to the original set {A, B, C} composed of the position data A, B and C of a user. By these partial sets (elements of power set) as the object data, the nodes are generated, respectively.

The processing section 108 extracts as the movement data, the position data showing the position before the movement to the position shown by each position data of the each node (partial set), and the position data which shows the position after the movement from the position shown by each position data of the partial set and is not contained in the partial set, and assigns all the extracted movement data to the node as the movement data set. In this case, the movement data may be single position data showing the actual position before/after the movement to/from the position shown by the object data and may be a set of the position data showing the one or more positions possible to exist before/after the movement to the object data. Also, the movement data may be only one of the position data showing the position before the movement and the position data showing the position after the movement exists and both may not exist. At this time, for example, the partial set (at least one object data), the position data showing the position before the movement and the position data showing the position after the movement are contained in the node.

When testing the anonymity of each node in the testing section 114, a threshold value is set and anonymity is determined in comparison with the threshold value. It is desirable that the threshold value can be set by the user as an anonymization policy. That is, in the information management apparatus 200, it is possible to be further provided with a setting receiving section (not shown) which receives the threshold value which determines an anonymous degree. The testing section 114 can change determination of the anonymity in comparison with the threshold value, regarding the position data generated by the abstracting section 110.

Figure 11:
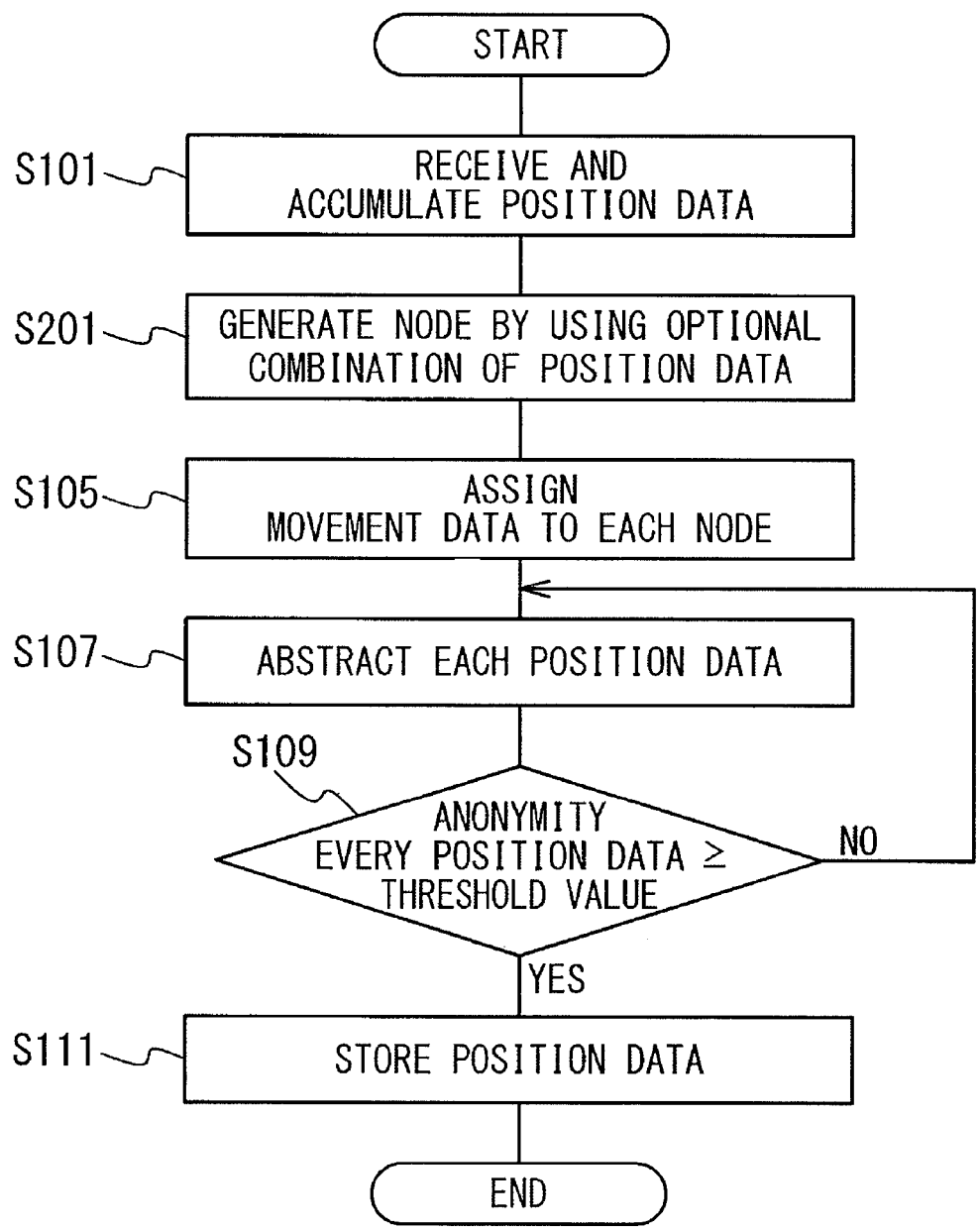
FIG. 11 is a flow chart showing an example of an operation (anonymization phase) of the information management apparatus according to the second and third exemplary embodiments of the present invention.

Next, the operation of the information management apparatus 200 according to the second exemplary embodiment of the present invention (data processing method) will be described. FIG. 11 and FIG. 6 are a flow chart showing an example of the operation of the information management apparatus 200 according to the second exemplary embodiment of the present invention. The operation of information management apparatus 200 is provided with the anonymization phase shown in FIG. 11 and the reference phase shown in FIG. 6. In this case, the anonymization phase has the steps S101 and S105-S109 like the operation of the information management apparatus 100 shown in FIG. 5 and a step S201 to be described below, as shown in FIG. 11. The reference phase has the same reference phase as that of the information management apparatus 100 shown in FIG. 6.

First, the anonymization phase of FIG. 11 will be described. The data receiving section 102 executes a data receiving procedure (Step S101 of FIG. 11).

The second extracting section 206 generates a power set every user from the set of the position data showing the action history every user stored at the step S101. The second extracting section 206 assigns a node to each element of the power set, and assigns as the movement data set to the node, a set of the position data of the positions before the movement to the positions shown by their object data, and the position data which are of the positions after the movement from the positions shown by their object data and which are not contained in each element, by using all the position data contained in each element as the object data (second extraction procedure: Step S201 in FIG. 11).

After that, the processing section 108 executes the processing procedure (Step S105 in FIG. 11). Next, the abstracting section 112 executes the abstraction procedure (Step S107 in FIG. 11). Then, the testing section 114 executes the test procedure (Steps S109 to S111 in FIG. 11). Next, the output section 118 executes the reception procedure (step S121 in FIG. 6) and the output procedure (step S123 in FIG. 6).

As described above, according to the information management apparatus 200 in the present exemplary embodiment, it is guaranteed that another different user exists by the set of the position data which is configured of a similar combination of the position data to an optional combination of the position data of the user, and which are not contained in the combination. Therefore, even if the viewer who knows that the user stayed in a plurality of positions refers to the position data set, it is difficult to specify the user and to know a position where the user stayed, other than the positions which the viewer knows. Thus, the action history can be anonymized such that the viewer can not know a new action of the user even if the viewer knew a part of the actions of the user.

[Third Exemplary Embodiment]

Figure 12:
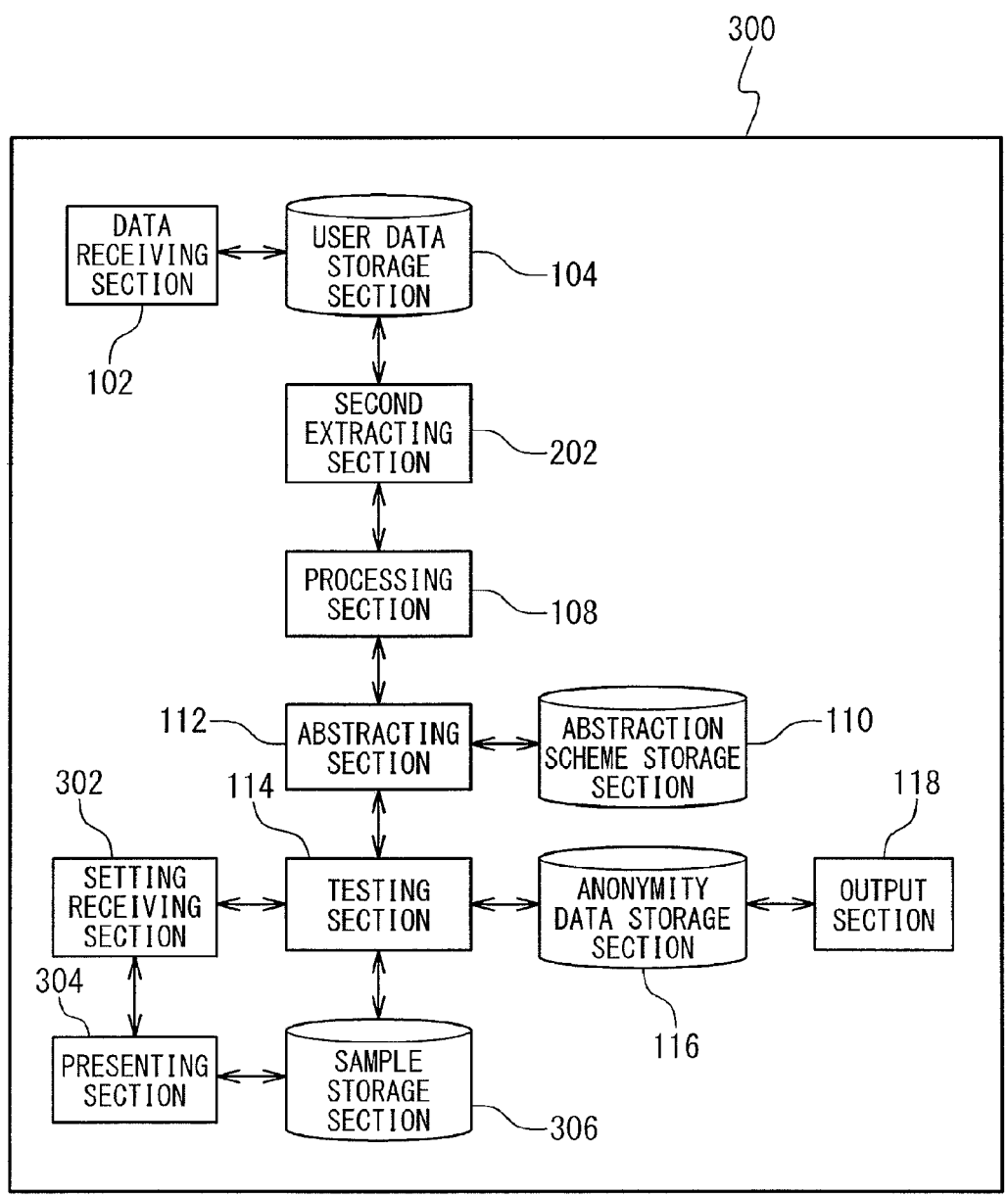
FIG. 12 is functional block diagram showing a configuration of the information management apparatus according to the third exemplary embodiment of the present invention.

First, the configuration of the information management apparatus 300 according to the third exemplary embodiment of the present invention will be described. FIG. 12 is a functional block diagram showing the configuration of the information management apparatus 300 according to the exemplary embodiment of the present invention. The information management apparatus 300 is provided with the data receiving section 102, the user data storage section 104, the second extracting section 202, the processing section 108, the abstraction scheme storage section 110, the abstracting section 112, the testing section 114, the anonymity data storage section 116, the output section 118, a setting receiving section 302, a presenting section 304, and a sample storage section 306.

The information management apparatus 300 in the present exemplary embodiment differs from the information management apparatus 200 in the second exemplary embodiment in that a sample of the position data provided for the viewer can be confirmed when a provider changes the threshold value of the anonymity. The different configuration will be described below.

The setting receiving section 302 receives a setting change of the threshold value in case of the anonymity test of the position data by the testing section 114. The sample storage section 306 stores the position data which passes the testing section 114 as a sample because the threshold value is changed. The presenting section 304 shows the sample stored in the sample storage section 306.

The presenting section 304 lists up some threshold values to be used when the testing section 114 determines the anonymity of the position data, and specifies threshold values for the setting receiving section 302. The presenting section 304 refers to the position data stored in the sample storage section 306 where the position data which satisfies the set threshold value are stored, and shows the threshold value and position data to the provider. The provider refers to the position data changing in dependence on the threshold value and can determine which of the threshold values is proper to it.

Figure 13:
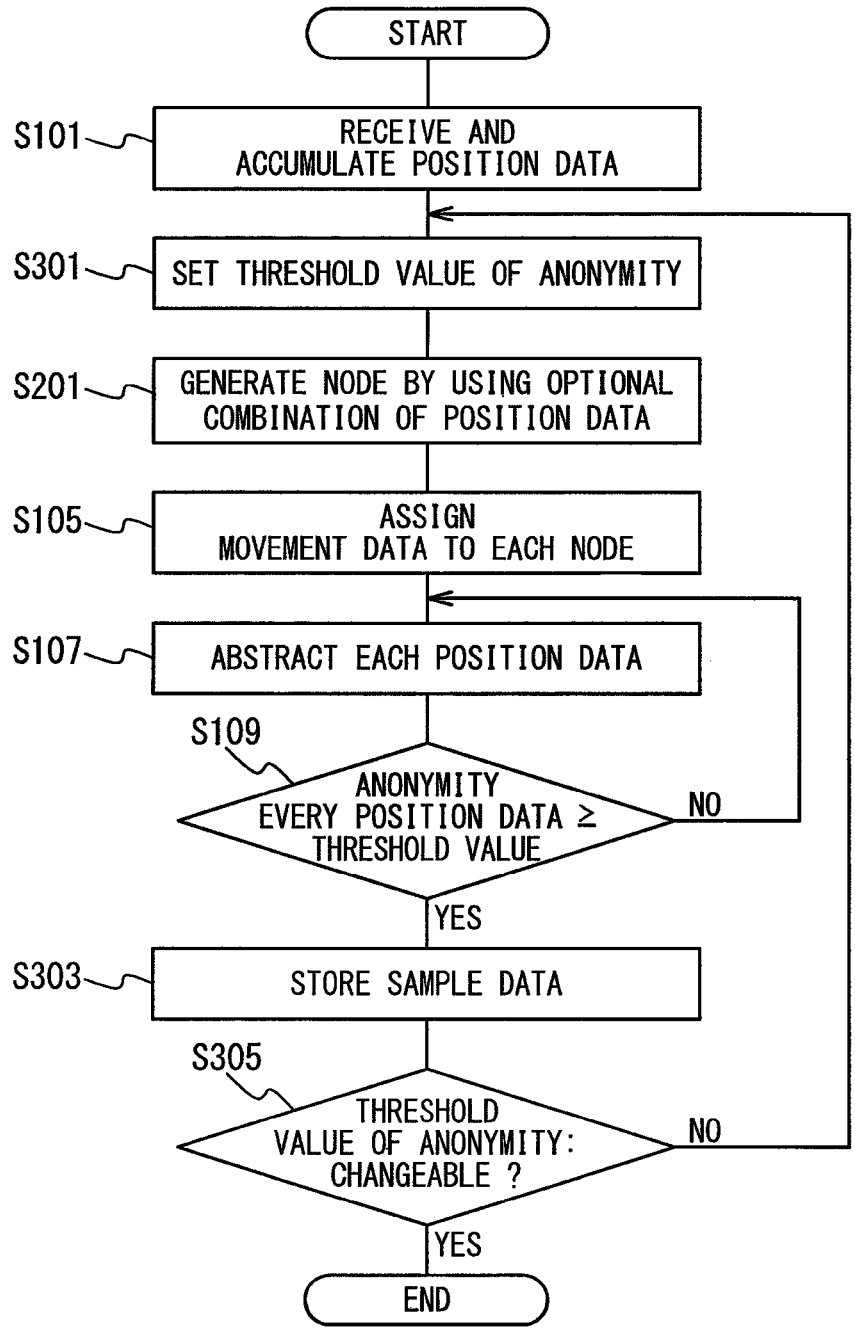
FIG. 13 is a flow chart showing an example of an operation (anonymization phase) of the information management apparatus according to the third exemplary embodiment of the present invention.

Next, the operation of the information management apparatus 300 according to the third exemplary embodiment of the present invention (data processing method) will be described. FIG. 13, FIG. 11 and FIG. 6 are a flow chart showing an example of the operation of the information management apparatus 300 according to the third exemplary embodiment of the present invention. The operation of information management apparatus 300 is provided with a sample generation phase shown in FIG. 13, the anonymization phase shown in FIG. 11 and the reference phase shown in FIG. 6. Here, the sample generation phase has the same steps S101, S201, and S105 to S109 as the operation of the information management apparatus 200 shown in FIG. 11 and steps S301 to S305 to be described later, as shown in FIG. 13. The anonymization phase has the same anonymization phase as the operation of the information management apparatus 200 shown in FIG. 11. The reference phase has the same reference phase as in the information management apparatus 100 shown in FIG. 6.

First, the sample generation phase of FIG. 13 will be described. The data receiving section 102 executes the data reception procedure (Step S101 in FIG. 13).

The presenting section 304 of FIG. 12 generates a threshold value list for the anonymization which can be set to the abstracting section 110 and sets the threshold value from the top of the list in order to the setting receiving section 302 (Step S301 in FIG. 13). Next, the second extracting section 206 executes the second extraction procedure (Step S201 in FIG. 13). After that, the processing section 108 executes the processing procedure (Step S105 in FIG. 13). Next, the abstracting section 112 executes the abstraction procedure (Step S107 in FIG. 13). Then, the testing section 114 executes the test procedure (Step S109 in FIG. 13).

When the position data satisfies the threshold value set at the step S301, the testing section 114 stores the position data to the sample storage section 306 (Step S303 in FIG. 13). The presenting section 304 repeats the processing of the steps S301, S201, S105, S107, S109, and S303 in FIG. 13 to all the threshold values contained in the threshold value list (Step S305 in FIG. 13).

It should be noted that the descriptions of the anonymization phase shown in FIG. 11 and the reference phase shown in FIG. 6 are omitted, because they are same as the second exemplary embodiment and the third exemplary embodiment, respectively.

As described above, according to information management apparatus 300 in the present exemplary embodiment, because the provider can confirm the sample of the position data provided for the viewer, according to the anonymous threshold value, the provider can determine an appropriate threshold value.

IMPLEMENTATION EXAMPLES

Implementation Example 1

As an implementation example of the information management apparatus of the present invention, an example of receiving position data of a plurality of users, and anonymizing the position data of each user (anonymization phase) to improve SDLD (l-diversity l-dimension) will be described. This implementation example shows one specific instance in the first exemplary embodiment.

Figures 14, 15:
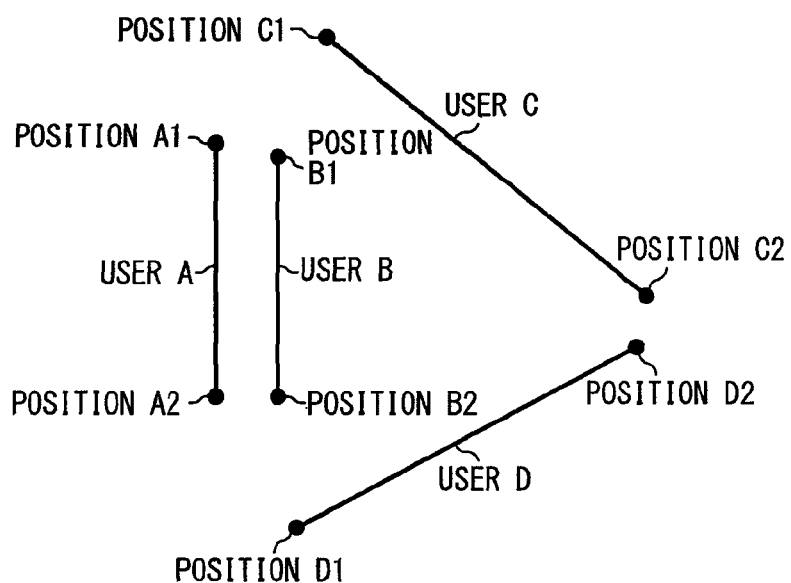
FIG. 14 is a table showing an example of a user data storage section in the information management apparatus according to an implementation example of the present invention.
FIG. 15 is a diagram showing the processing of the information processing apparatus according to the implementation example of the present invention.

The data receiving section 102 receives the position data of the user A to the user D periodically, and for example, stores a position data list in the user data storage section 104, as shown with FIG. 14 when being shown onto the map (Step S101). FIG. 14 shows a part of the position data of the user A to the user D which are received every one hour as an example. In this example, the position data is composed of the position measurement data ("position") shown by latitude and longitude, and user name and the accompaniment data ("position measuring time" and "user name") shown by a position measuring time.

For example, it is supposed that each position data of the user A to the user D of the position data list of FIG. 14 is shown onto the map as shown in FIG. 15. In FIG. 15, a black point shows a position where the user stays for a long time and which is shown by latitude and longitude. A line linking a block point and another block point shows movement of the user with a user name assigned to the line between the two black points. The user A stays at a position A1 and a position A2 for a long time and shuttles from one of the two points to the other. The user B stays at a position B1 and a position B2 for a long time and shuttles from one of the two points to the other. The user C stays at a position C1 and a position C2 for a long time and shuttles from one of the two points to the other. The user D stays at a position D1 and a position D2 for a long time and shuttles from one of the two points to the other. Also, distances between the position A1 and the position B1, between the position A2 and the position B2, and between the position C2 and the position D2 are supposed to be within 300 m. Also, distances between the position A1 and the position C1, between the position B1 and the position C1, between the position A2 and the position D1, between the position B2 and the position D1 are supposed to be within 500 m.

The first extracting section 106 generates a node so as to contain a user name of each black point of FIG. 15 and one of the black points as object data regarding all position data (Step S103). The node containing a position X is expressed as a node X.

Next, the processing section 108 assigns a movement data set which has one or more movement data as elements to the node, by manipulating as the movement data, each of the position data before the movement to the position shown by the object data of each node and the position data after the movement from the position shown by the object data (Step S105). In an example of FIG. 15, a movement data set is generated and registered to have as an element, movement data from the black point showing the object data of a node to another black point connected with the black point by a line. For example, regarding the node A1, the movement data set {A2} is registered on the node A1 to have as an element, a position A2 (position data after the movement from the position shown by the object data) connected with the position A1 (object data) contained in the node A1 by a line. In case of this example, there is no position data before the movement to the position shown by the object data. Oppositely, regarding a node A2, the movement data set {A1} is registered on the node A2 to have as an element, the position A1 (position data before the movement from the position shown by the object data) connected with the position A2 (object data) contained in the node A2 by a line. In case of this example, there is no position data after the movement to the position shown by the object data.

The abstraction scheme and the priority shown in FIG. 16 are supposed to be related to each other and stored in the abstraction scheme storage section 110. The priority shows an application order of the operation of the abstraction to be carried out to the object data contained in each node. Also, as the abstraction scheme, the abstraction of the position such as the extension of a position to a 300 m range and the position data deletion is exemplified. For example, when an abstraction scheme is applied to the position data for the first time, the abstraction described in the priority 1 is not carried out, and when the abstraction scheme is applied to the position data for the second time, the position is converted into a 300 m area described in the priority 1 for abstracting the position.

The abstracting section 112 applies the abstraction scheme of the priority 1 stored in the abstraction scheme storage section 110 to all the nodes (Step S107). As shown in FIG. 16, no operation is carried out in the abstracting method of the priority 1 ("no operation"). Therefore, the object data of the node is as shown in FIG. 15 and there is not a change.

The testing section 114 searches another node which has a user name different from a user name of each node and a same position as the object data of the node and which has a different movement data from the movement data set of the node (Step S109). However, in case of FIG. 15, because there is no node which the object data is identical, there is not any node which passes the test by the testing section 114 (Step S109: No).

Next, the abstracting section 112 applies the abstracting method of the priority 2 to each node (Step S107). As shown in FIG. 16, the abstracting method of the priority 2 is to extend (extension of a position to a 300 m area) the position data shown with latitude and longitude to a circle area in a range of 300-m diameter. Through this abstraction, the user position can be abstracted from a precise position shown with the latitude and the longitude to ambiguous data such as the inside of the area of 300-m diameter. That is, the anonymized object data is generated by the abstracting precise data shown with latitude and longitude.

Figure 17:
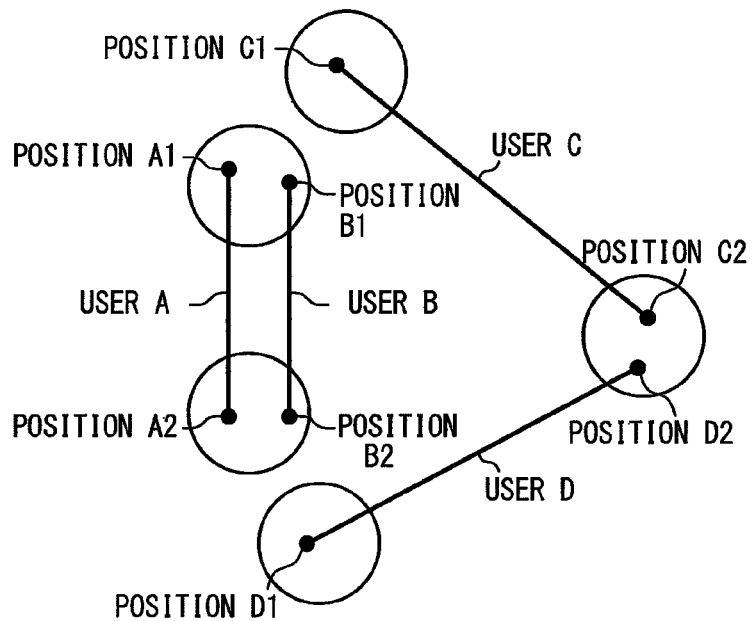
FIG. 17 is a diagram showing the processing of the information management apparatus according to the implementation example of the present invention.

That is, the abstracting section 112 can obtain the object data (the position data anonymized by the abstraction) such as a circle shown in FIG. 17 by applying the abstraction scheme of the priority 2 stored in the abstraction scheme storage section 110 to all the nodes. The circle containing the black point shows an area of 300-m diameter and the position shown by the black point position is abstracted. For example, the position A1 of the user A and the position B1 of the user B are determined to be an identical position.

The testing section 114 searches another node which has a different user name from that of each node and a same position as that of the object data and which is different in movement data set from the node, and tests whether or not the number of other nodes is equal to or more than a threshold value (Step S109). Here, it is supposed that the threshold value is 1. If there is one other node meeting a condition, it is supposed that the test is passed. Regarding the node C2 containing a position C2, the position D2 of the user D is in the same position, the movement data of the node C2 is {position C1}, the movement data of the node D2 is {position D1}, and the position C1 and the position D1 are different. The node C2 and the node D2 pass the test (step S109: Yes) and are stored in the anonymity data storage section 116 (Step S111).

On the other hand, the other nodes do not pass the test by the testing section. For example, although the position B1 of the user B is in the same position as the position of the node A1, the movement data of the node A1 has the position A2, the movement data of the node B1 has the position B2, and the position A2 and the position B2 have same position. Therefore, they do not pass the test (Step S109: No). The same thing is applied to the other nodes.

Next, the abstracting section 112 applies the abstraction scheme again to the nodes A1, A2, B1, B2, C1, and D1 which do not pass the test (Step S107). Because the abstracting method is applied to the third time to the nodes, the abstraction of the priority 3 is applied, as shown in FIG. 16. The abstraction of the priority 3 is to extension position data into an area of the circle of 500-m diameter ("extends a position to a 500-m range"). Through this abstraction, the position of the user can be made more ambiguous such as presence in the 500-m range. That is, the object data can be further abstracted and anonymized from data of presence in the 300-m range.

Figure 18:
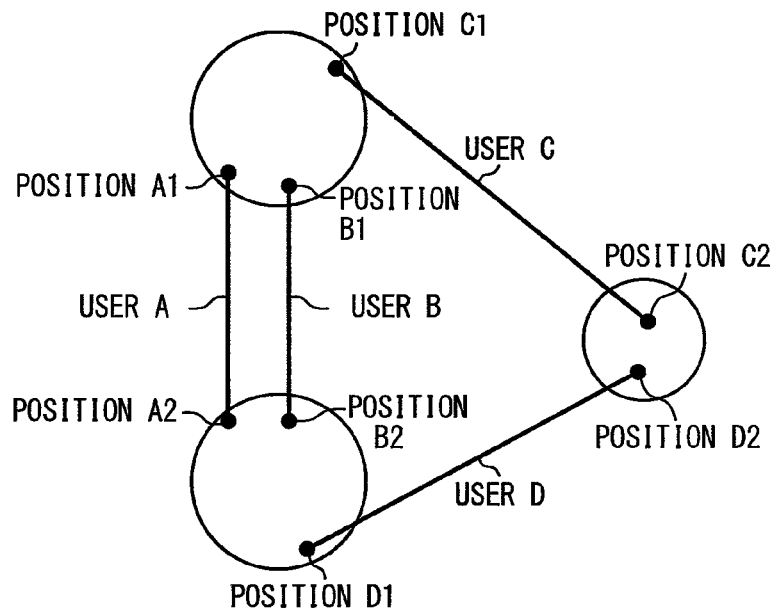
FIG. 18 is a diagram showing the processing of the information management apparatus according to the implementation example of the present invention.

That is, the abstracting section 112 can obtain the object data (further abstracted and anonymized position data) by applying the abstraction scheme of the priority 2 stored in the abstraction scheme storage section 110 to all the nodes, as shown in FIG. 18. The large circle containing the black point shows a circle of 500-m diameter, and each position shown by the black point is made further abstracted. For example, it is determined that the position A1 of the user A, the position B1 of the user B, and the position C1 of the user C are same in position.

The testing section 114 searches another node which has a different user name from that of each node and a same position as that of the object data of the node and which is different in the movement data set, and checks whether or not the number of other nodes is equal to or more than the threshold value (Step S109). As for the node A1, the node B1 and the node C1 are in a same position, and the position C2 contained in the movement data of the node C1 has a position different from the position A2 of the movement data of the node A1. Therefore, the node A1 passes the test by the testing section 114. The same thing is applied to the node B1 and the node C1. Also, regarding the node A2, the node B2 and the node D1 are in a same position, and the position D2 contained in the movement data of the node D1 is different from the position A1 of the movement data of the node A2. Therefore, the node A2 passes the test by the testing section. The same thing is applied to the node B2 and the node D1. The nodes A1, B1, C1, A2, B2, and D1 pass the test by the testing section 114 (step S109: Yes) and are stored in the anonymity data storage section 116 (Step S111).

For example, the anonymity data storage section 116 can be shown as shown in FIG. 19 in correspondence to the user data storage section 104. The anonymization is attempted by extending the range of the position (abstracted) as shown in this figure and increasing users in similar positions.

Implementation Example 2

Next, as the implementation example of the information management apparatus of the present invention, an example (anonymization phase) which the anonymization is carried out to the position data of each user to improve MDLD (multi-dimension l-diversity) in order to prevent the viewer who knows a part of positions of the user from knowing other positions where the user stayed will be described. This implementation example shows one specific instance of the second exemplary embodiment.

Figure 20:
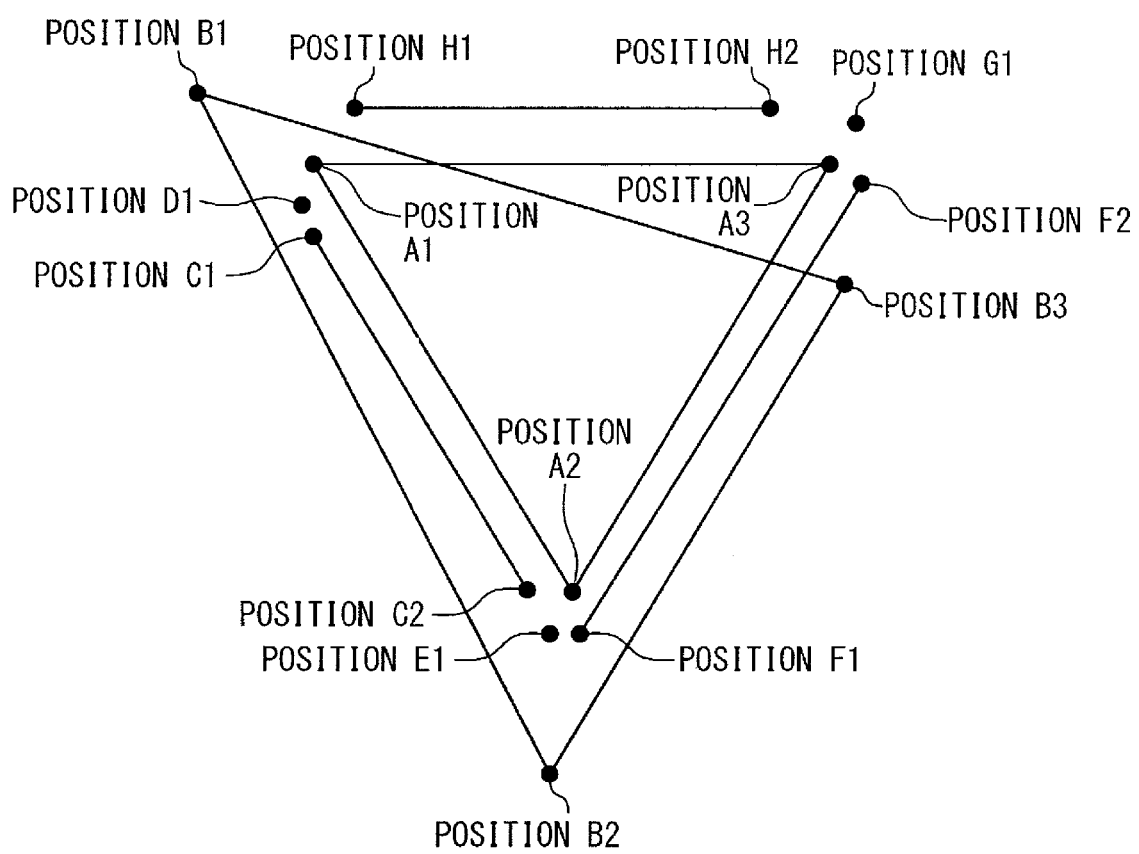
FIG. 20 is a diagram showing the processing of the information management apparatus according to the implementation example of the present invention.

The data receiving section 102 receives the position data of the user A to the user H periodically, and stores a position data list in the user data storage section 104 as shown onto a map of FIG. 20 (Step S101). In FIG. 20, the black points and the line are same as in the implementation example 1. The black point shows a position where the user stays for a long time, by latitude and longitude, and the line shows that the user shuttles between the positions where the user stays. The position XN (N=1, 2, 3, . . . ) assigned to the black point is position data of the user X (A, B, C, D, E, F, G, H, . . . ).

It should be noted that the position H1 and the position D1 are in the circle of 300-m diameter from the position A1, and the position B1 and the position C1 are in the circle of 500-m diameter from the position A1. Also, the position G1 and the position F2 are in the circle of 300-m diameter from the position A3, and the position H2 and the position B3 are in the circle of 500-m diameter from the position A1. Moreover, the position C2, the position E1, and the position F1 are in the circle of 300-m diameter from the position A2, and the position B2 is in the circle of 500-m diameter from the position A2.

The anonymization of the position data of the user A will be described below for convenience, but the same thing is accomplished for the anonymization of the position data of the other user.

The second extracting section 202 generates a node containing object data by using as object data, a set (partial set) having optional position data of the user A as an element (Step S201). For example, because the position data of the user A is A1, A2 and A3, the original set is {A1, A2, A3}, and a partial set thereof, i.e. the object data becomes {A1}, {A2}, {A3}, {A1,A2}, {A1,A3}, {A2,A3}, {A1,A2,A3}. Then, the node is generated to contain their object data.

The processing section 108 registers a movement data set having movement data as an element onto the node by using the position connected by line from the object data contained in the node as the movement data (Step S105). The movement data set of the node having the object data of {A1} is {A2, A3}. The movement data set of the node having the object data of {A2} is {A1, A3}. The movement data set of the node having the position data of {A1, A2} is {A3}. The movement data set of the node having the position data of {A1, A3} is {A2}. The movement data set of the node having the position data of {A2, A3} is {A1}. Moreover, the movement data set of the node having the position data of {A1, A2, A3} becomes { }.

Like implementation example 1, the abstraction scheme and the priority shown in FIG. 16 are supposed to be related each other and stored in the abstraction scheme storage section 110.

The abstracting section 112 applies the abstraction scheme of the priority 1 stored in the abstraction scheme storage section 110 to all the nodes (Step S107). As shown in FIG. 16, the abstracting method of the priority 1 is a process of no operation. Therefore, the object data of the node is as shown in FIG. 20 as just it is and there is not a change.

The testing section 114 searches another node which has a different user name from that of each node and a same position as that of the object data of the node, and which is different in movement data set (Step S109). However, in case of FIG. 20, because no node having the identical object data exists, there is no the node which passes the test by the testing section 114 (Step S109: No).

Next, the abstracting section 112 applies the abstracting method of the priority 2 to each node (Step S107). As shown in FIG. 16, the abstracting method of the priority 2 is to extend ("extending a point to a circle of 300-m diameter") the position data shown with latitude and longitude to data of a circle of 300-m diameter. Through this abstraction, the user position can be made ambiguous from the precise position specified with latitude and longitude to an area of the circle of 300-m diameter. That is, the accurate data of latitude and longitude can be converted to anonymized object data through the abstraction.

Figure 21:
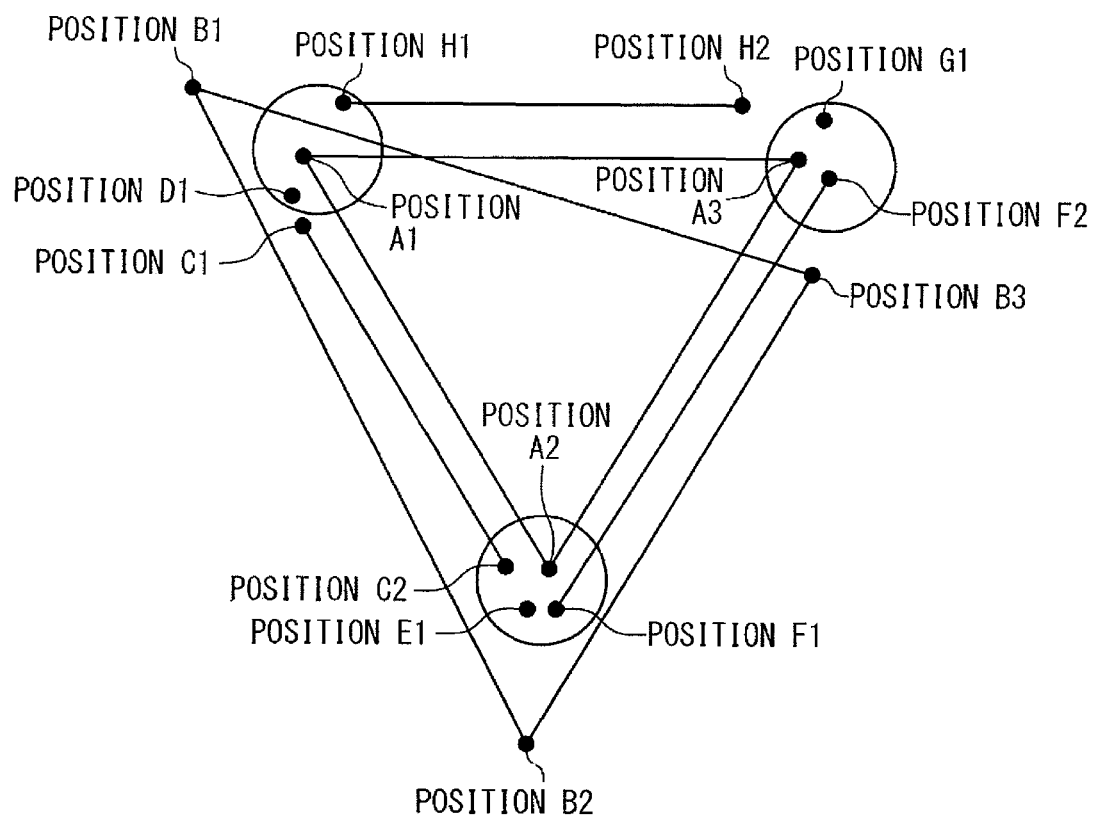
FIG. 21 is a diagram showing the processing of the information management apparatus according to the implementation example of the present invention.

That is, the abstracting section 112 can obtain the object data shown in FIG. 21 (the position data anonymized by the abstraction) by applying the abstraction scheme of the priority 2 stored in the abstraction scheme storage section 110 to all the nodes, as shown in FIG. 16. The circle containing the black point shows the area of 300-m diameter and the position shown by the black point is made to ambiguous. For example, the position A1 of the user A and the position H1 of the user H are determined to be a same position.

The testing section 114 checks whether or not the number of other nodes which are in a same position and have different movement data is equal to or more than a threshold value (Step S109). It should be noted that the threshold value is supposed to be set to 1. If the node of the user meeting a condition is one, the node passes the test. The node A1 having the position data of {A1} passes the test because there is the node D1 which has the movement data which is different from the movement data of the node A1 and has the position data of {D1} showing the same position as the node A1. The node A1 having the position data of {A2} passes the test, because there is the node E1 which has the movement data which is different from the movement data of the node A2 and has the position data of {E1} showing the same position as the node A2. The node A3 having the position data of {A3} passes the test, because there is the node G1 which has the movement data which is different from the movement data of the node A1 and has the position data of {G1} showing the same position as the node A3. The nodes A2 to A3 the position data of {A2, A3} pass the test, because there are nodes which have the movement data which are different from the movement data of these nodes and have the position data of {F1, F2} showing a same position as the poison data {A2, A3}. However, the other nodes A1 and A2 (position data {A1, A2}), nodes A1 and A3 (position data {A1, A3}) and nodes A1, A2, and A3 (position data {A1, A2, A3}) do not pass the test. In this way, because the other nodes containing A1, A2 and A3 do not pass the test, all the nodes become objects for the abstraction (Step S109: No).

Next, the abstracting section 112 applies the abstracting method of a priority 3 to all the nodes (Step S107). As shown in FIG. 16, the abstracting method of the priority 3 is to extend ("extending a position into the 500-m range") the position data shown at the latitude and the longitude into the circle in the range with 500-m diameter. Through this abstraction, the position data is made ambiguous from data specified with latitude and longitude to area data of a circle of 500-m diameter. That is, the object data is further abstracted from the data of the 300-m range to the anonymized data.

Figure 22:
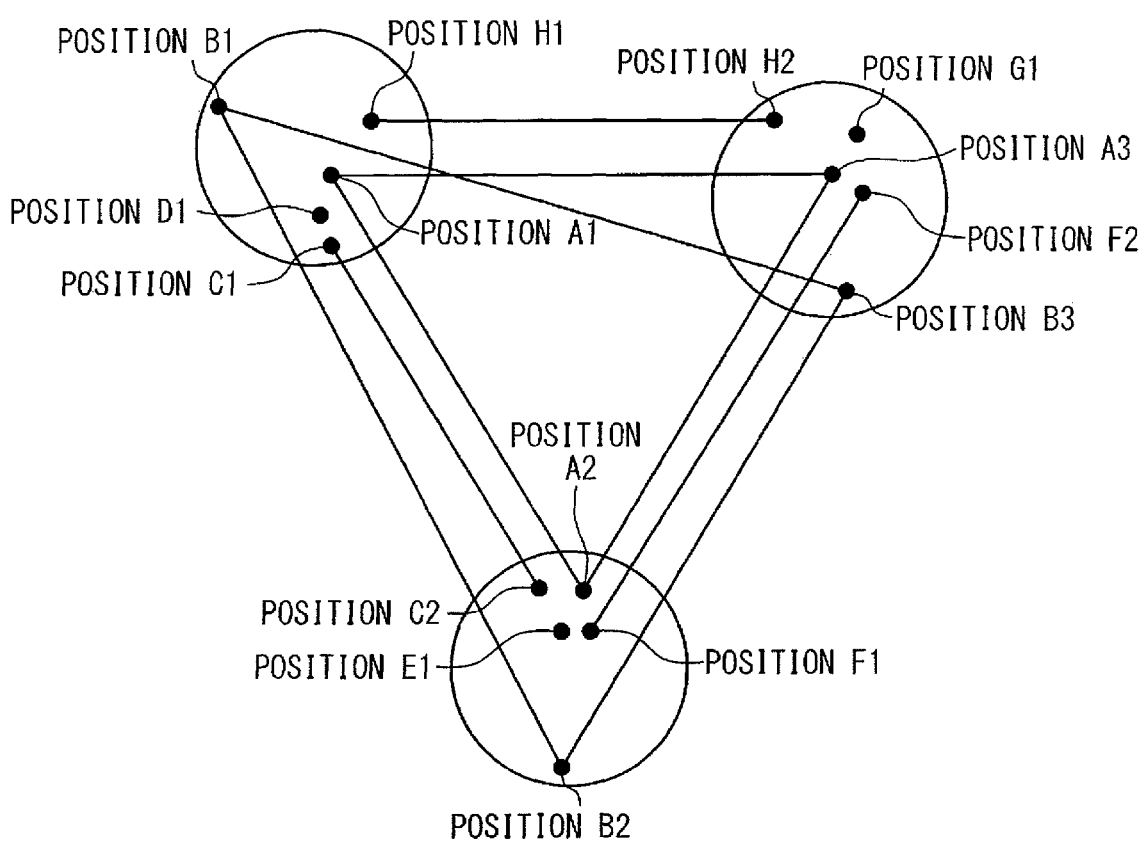
FIG. 22 is a diagram showing the processing of the information management apparatus according to the implementation example of the present invention.

That is, the abstracting section 112 generates nodes which have object data (further abstracted and anonymized position data) by applying the abstraction scheme of the priority 3 stored in the abstraction scheme storage section 110 to all the nodes, as shown in FIG. 22. The circle containing a black point shows an area of 500-m diameter, and the position shown by the black point was made ambiguous. For example, the position A1 of the user A and the position B1 of the user B are determined to be in a same position.

The testing section 114 checks whether or not there are one or more nodes of other users being in a same position and having different movement data, again to all the nodes (Step S109). In this case, because all the nodes pass the test (step S109: Yes), all the positions A1, A2, and A3 are stored in the anonymity data storage section 116 (Step S111).

For example, the anonymity data storage section 116 can be shown in FIG. 23 about the user A and the user B. The anonymization is attempted by extending (abstracting) the range of the position, and increasing the users who is in a similar position, as shown in FIG. 23.

Implementation Example 3

Next, an example (sample generation phase) in which an appropriate threshold value is determined while the user refers to a sample based on a difference of an anonymity threshold value, as an implementation example of the information management apparatus of the present invention will be described. This implementation example shows one specific instance of the third exemplary embodiment.

Like the implementation example 2, the data receiving section 102 receives the position data of the user A to the user H periodically, and store the position data list in the user data storage section 104 as shown in FIG. 20 when showing on a map (Step S101).

It is supposed that the threshold values which can be set to the testing section 114 are any of 0, 0.2, and 1. The threshold value of "0" shows that it is allowed that there is no user who is same in position data but different in movement data, in all the nodes of the users. The threshold value of "0.2" shows that there is at least one user who is same in the position data but different in the movement data, in 20% of all the nodes of the users. The threshold value of "1" shows that there is at least one user who is same in the position data but different in the movement data, in all the nodes of the users.

The presenting section 304 first sets "0" as the threshold value to the testing section 114 (Step S301). Because the test is carried out with the priority 1 in case of the threshold value of "0", the position data of FIG. 24 is generated as a sample (Steps S201, S105 to S109, and S303).

Figure 25:
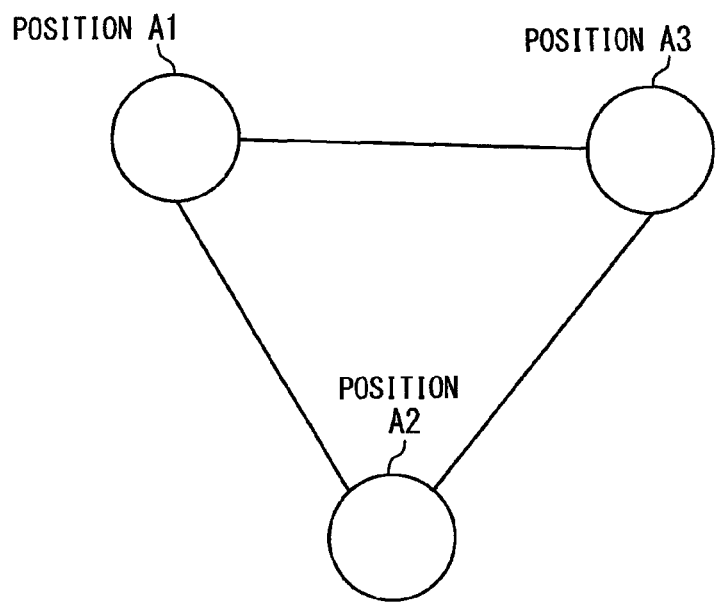
FIG. 25 is a diagram showing the processing of the information management apparatus according to the implementation example of the present invention.

Next, because the presenting section 304 can set another threshold value (Step S305: Yes), the presenting section 304 sets the threshold value of "0.2" to the testing section 114 (Step S301). Because two nodes of the seven nodes pass the test by applying the abstraction scheme of the priority 2, a sample of FIG. 25 in this condition is generated (Steps S201, S105 to S109, S303).

Figure 26:
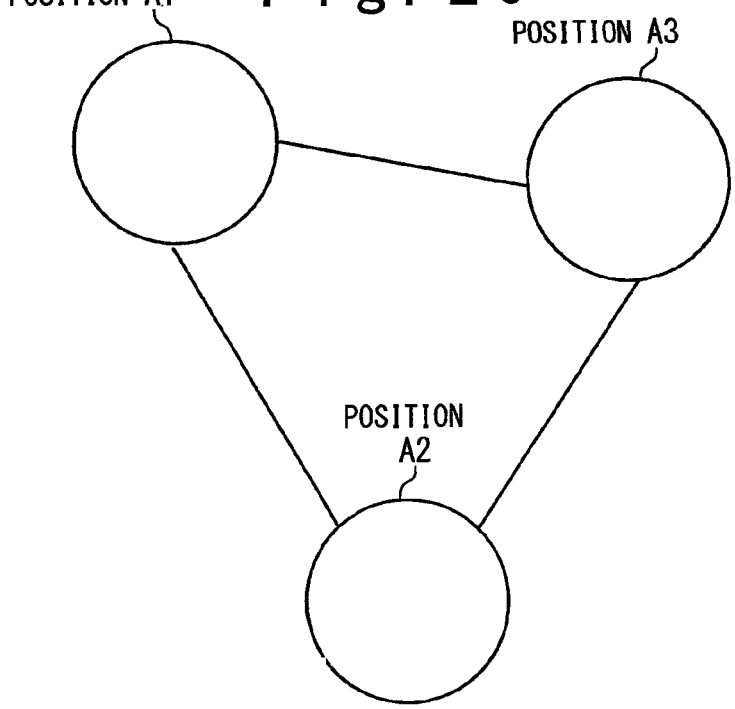
FIG. 26 is a diagram showing the processing of the information management apparatus according to the implementation example of the present invention.

Moreover, because the presenting section 304 can set the other threshold value (step S305: Yes), the presenting section 304 sets the threshold value of "1" to the testing section 114. AS described in implementation example 2, all of the seven nodes pass the test of the testing section by applying the abstraction scheme of the priority 3, a sample of FIG. 26 is generated.

The presenting section 304 presents three samples formed thus and the threshold values to the user A, and the user A compares the samples and sets a desirable one of the threshold values to the user A wants to the setting receiving section 302.

Implementation Example 4

Figure 27:
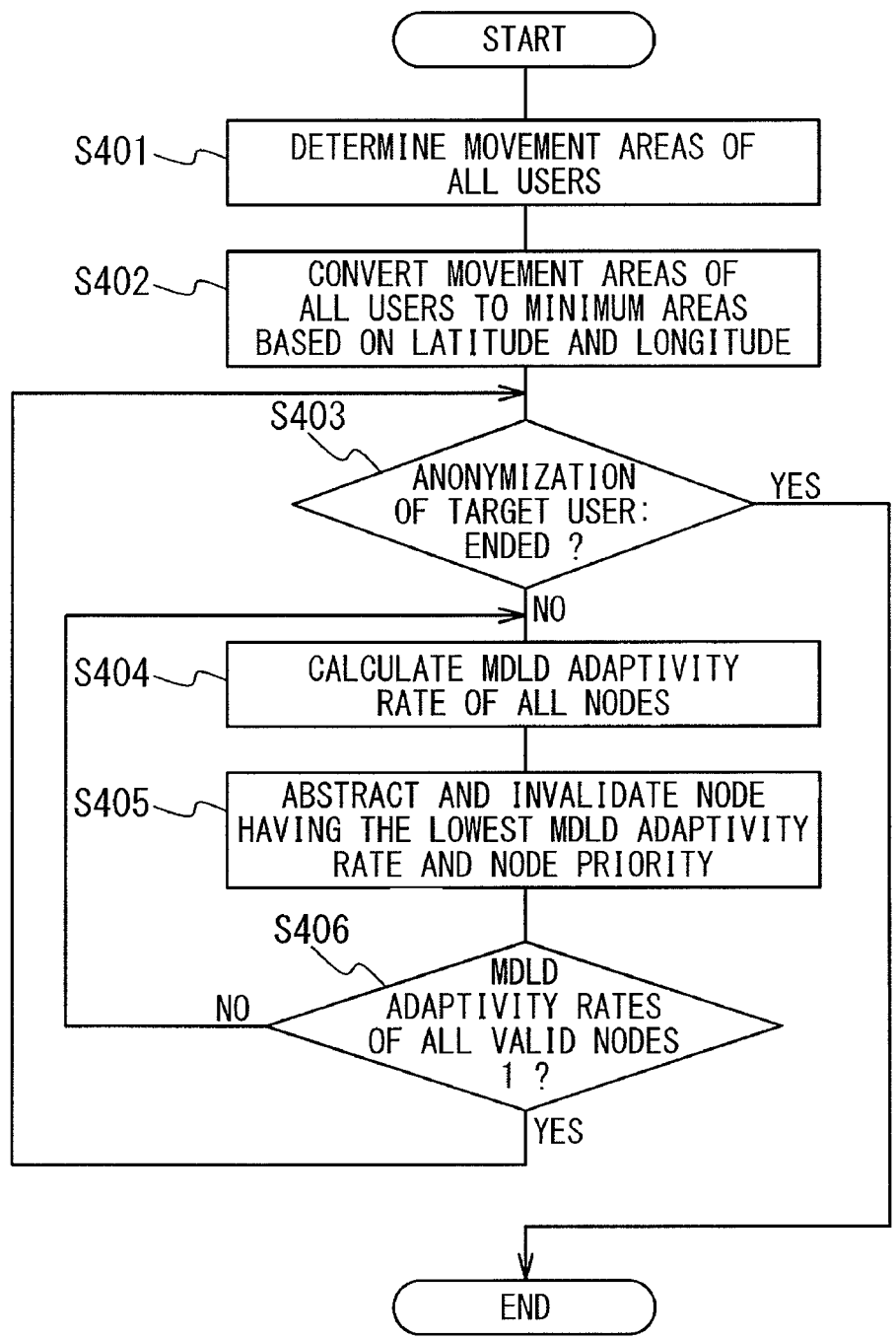
FIG. 27 is a diagram showing the processing of the information management apparatus according to the implementation example of the present invention.

Next, the anonymization algorithm which meets (MDLD guarantee is formed) with MDLD (multidimensional l diversity) as the implementation example of the information management apparatus of the present invention and it will be described with reference to FIG. 27. This implementation example shows one transformation example of the second exemplary embodiment.

First, the second extracting section 206 refers to the user data storage section 104 and derives a movement area (which consists of the node latitude and longitude form) of the object user (Step S401). The object users are all the users.

Here, the movement area shows one or more positions where a user stays or one or more positions which the user moves from now, and is composed of one or more nodes. The movement area corresponds to partial sets (or, a node in the second exemplary embodiment) which are elements of the power set in the second exemplary embodiment. Also, the node in the present implementation example shows one position of the user shown with latitude and longitude and mesh code (code of numeric expression to distinguish meshes). That is, the node corresponds to the position (data) contained in the node in the second exemplary embodiment. For example, the mesh is an area mesh defined by Ministry of Internal Affairs and Communications, and the classification of an object has ¼ meshes (250-m×250-m), ½ meshes (250-m×250-m), twice of meshes (2-km×2-km).

Next, the second extracting section 206 converts a node of the object user in the movement area from data form of the latitude and the longitude to data of a minimum area (Step S402). For example, the second extracting section 206 converts the node in the form of the latitude and the longitude of the movement area to the ¼ mesh code. The object users are all the users. At this time, the processing section 108 extracts predetermined movement data of each movement area and assigns it to the movement area as the movement data set.

Until the anonymization of all the object users completes (step S403: Yes), the anonymization of the following steps S404 to S406 is repeated every object user.

The testing section 114 calculates the MDLD adaptivity rate of all the nodes (Step S404). That is, the testing section 114 calculates the MDLD adaptivity rates of all the nodes contained in the movement area of some user.

Here, the MDLD adaptivity rate is as follows. There are n positions (nodes) (of the user) contained in the movement area of the user. When being focused on one node, the combinations of the overlapping of the positions containing the node are $2^{n-1}$. Of $2^{n-1}-1$ combinations by excluding a case to overlapping all the nodes from the $2^{n-1}$ combinations, some combinations of overlapping the other user (of one or more) is referred to as the MDLD adaptivity rate. For example, when being focused on one node p1 of the action containing four nodes p1, p2, p3, and p4, overlapping of the position containing the node p1 is {p1}, {p1, p2}. {p1, p3}, {p1, p4}, {p1, p2, p3}, {p1, p2, p4}, {p1, p3, p4} and there are 7 ($=2^{4-1}-1$) combinations. Here, when only the other user (equal to or more than one) who contains the same position as {p1, p2}, {p1, p4} in the action range exists, the MDLD adaptivity rate is $2/7$.

The abstracting section 112 abstracts and invalidates a node with the lowest of the MDLD adaptivity rate and the node priority (Step S405). An area of a node with the lowest MDLD adaptivity rate of the effective nodes (non-invalidated nodes) contained in the movement area is abstracted by 1 step (ex. the steps of the priority shown in FIG. 16). Here, the node is invalidated (corresponding to position data deletion of priority 4) when the area of the corresponding node is double mesh code.

In this case, the area of the node having the lowest MDLD adaptivity rate and the lowest node priority of the effective nodes contained in the movement area may be abstracted by 1 step. Here, the node priority is a priority of a node itself, and in case of the action range, the priority of places visited more frequently such as the home and the working place is made high. For example, the priority can be determined by referring to the user data storage section 104, and extracting and comparing frequencies to visit and stay of each node.

The testing section 114 determines whether or not the MDLD adaptivity rates of all the effective nodes are 1 (Step S406). The anonymization processing of the movement area of one user is completed when the adaptivity rates of all the effective nodes become "1".

In the exemplary embodiments (implementation examples) shown above, an optional combination of components between the exemplary embodiments (implementation examples) and change of expressions of the exemplary embodiments (implementation examples) between the methods, the apparatuses, the storage media, computer programs and so on are effective as a part of the present invention.

Also, various components in the exemplary embodiments (implementation examples) are not always necessary to be respectively independent existence. A plurality of components may be formed as one apparatus, one element of each of a plurality of apparatuses may be formed as one component, and a component may be a part of another component. Also, a part of a component may overlap a part of another component.

Also, a plurality of procedures are mentioned in order in the data processing method and the computer program in the exemplary embodiments (implementation examples). However, the order does not restrict an execution order of the plurality of procedures. Therefore, when the data processing method and the computer program in the exemplary embodiments (implementation examples), the order of the plurality of procedures may be changed in a range where there is not hindrance in content.

Moreover, each of the plurality of procedures of the data processing method and the computer program in the exemplary embodiments (implementation examples) is not limited to be executed at a different timing. Therefore, a procedure may occur during execution of another procedure, and a part or whole of the execution time may overlap between two or more procedures.

Although the present invention has been described with reference to the exemplary embodiments (implementation examples), the present invention is not limited to the exemplary embodiments (implementation examples). Various modifications that a skilled person in the art can understand in the configuration of the present invention are in the scope of the present invention. Also, it is possible to combine the exemplary embodiments (implementation examples) in a range where technical contradiction does not occur.

This application claims a priority based on Japanese Patent Application No. JP 2009-234897, which was filed on Oct. 9, 2009, and the disclosure thereof is incorporated herein by reference.

The invention claimed is:

1. An information management apparatus comprising:
a data receiving section configured to receive position data periodically from each of a plurality of mobile terminals, wherein said position data contains position measurement data showing a position of said mobile terminal and accompaniment data composed of measurement time of the position measurement data and identification data of a user of said mobile terminal;
a user data storage section configured to store the position data received by said data receiving section as action history every user;
a first extracting section configured to generate a node composed of the identification data of the user of the position data and object data, by using each of the position data of the action history stored in said user data storage section as the object data;
a processing section configured to register on said node, a movement data set having as an element, at least one of the position data showing a position before movement to a position shown by the object data and the position data showing a position after the movement from the position shown by the object data, with respect to the object data contained in said node;
an abstraction scheme storage section configured to store an abstraction scheme to the position data;
an abstracting section configured to apply the abstraction scheme stored in said abstraction scheme storage section to the object data of said node; and
a testing section configured to extract other nodes, each of which has identification data different from that of the user of the node, which has the object data abstracted by said abstracting section, and object data of a same position as a position of the object data of the node or a position contained in a position of the object data of the node, and each of which has a movement data set with which a product set of the movement data set of the node is an empty set, and output the object data of the node as anonymity data when the number of other nodes is equal to or more than a predetermined threshold value.

2. The information management apparatus according to claim 1, wherein said abstraction scheme storage section relates and stores an abstraction scheme and a priority,
wherein when the number of other nodes is less than the threshold value, said abstracting section further abstracts the object data of said node by the abstraction scheme, related to the priority determined based on the number of times of the abstraction, of the abstraction schemes stored in said abstraction scheme storage section, and
wherein said testing section extract the other nodes to said node having the object data abstracted by said abstracting section, and outputs the object data of said node as the anonymity data when the number of other nodes is equal to or more than the threshold value.

3. The information management apparatus according to claim 1, wherein said abstraction scheme is one of abstraction of the position measurement time, deletion of the user identification data, abstraction of the position measurement data, and part deletion of the position data.

4. An information management apparatus comprising:
a data receiving section configured to receive position data periodically from a plurality of mobile terminals, wherein said position data contains position measurement data showing a position of each of said plurality of mobile terminals and accompaniment data composed of measurement time of the position measurement data and identification data of a user of said mobile terminal;
a user data storage section configured to store the position data received by said data receiving section as action history every user;
a second extracting section configured to generate a power set to at least one position data of action history stored in said user data storage section, and generate a node composed of identification data of the user of the position data and object data by using each element of the power set as the object data;
a processing section configured to register on said node, a movement data set having as an element, at least one of the position data showing a position before movement to a position shown by the object data and the position data showing a position after the movement from the position shown by the object data, with respect to the object data contained in said node;
an abstraction scheme storage section configured to store an abstraction scheme to the position data;

an abstracting section configured to apply the abstraction scheme stored in said abstraction scheme storage section to the object data of said node; and a testing section configured to extract other nodes, each of which has identification data different from that of the user of the node, which has the object data abstracted by said abstracting section, and object data of a same position as a position of the object data of the node or a position contained in a position of the object data of the node, and each of which has a movement data set with which a product set of the movement data set of the node is an empty set, and output the object data of the node as anonymity data when the number of other nodes is equal to or more than a predetermined threshold value.

5. The information management apparatus according to claim 4, wherein said testing section calculates a diversity adaptivity rate every position data to all the position data contained in the object data, and outputs the object data of said node as the anonymity data when the diversity adaptivity rates of all the position data are equal to or higher than a threshold value, wherein the diversity adaptivity rate of the position data is a value showing the number of combinations in which the position data of said node overlap the position data of the other users, of $(2^{n-1}-1)$ combinations obtained by subtracting a combination when all the position data overlap from $(2^{n-1})$ combinations of overlapping of positions of each position data, when there are n position data, and wherein when the diversity adaptivity rates of all the position data are less than the threshold value, said abstracting section further abstracts the position data having the lowest diversity adaptivity rate once.

6. The information management apparatus according to claim 4, further comprising:

a managing section configured to carry out management of addition, deletion, and change of the abstraction scheme to said abstraction scheme storage section.

7. The information management apparatus according to claim 4, further comprising:

a setting receiving section configured to set the threshold value such that the node passes the test of said testing section.

8. The information management apparatus according to claim 7, further comprising:

a presenting section configured to present to the user, a difference of the anonymity data when the nodes pass the test of said testing section based on a difference of the threshold values.

9. A data processing method of an information management apparatus, which comprises a user data storage section which stores position data received from each of a plurality of mobile terminals as action history every user, wherein the position data contains position measurement data showing a position of said mobile terminal and accompaniment data composed of measurement time of the position measurement data and identification data of a user of said mobile terminal, and a abstraction scheme storage section which stores an abstraction scheme of the position data, said data processing method comprising:

receiving the position data periodically from said mobile terminal;

generating a node composed of the identification data of the user of the position data and object data, by using each of the position data of the action history stored in said user data storage section as the object data;

registering on said node, a movement data set having as an element, at least one of the position data showing a position before movement to a position shown by the object data and the position data showing a position after the movement from the position shown by the object data, with respect to the object data contained in said node;

applying the abstraction scheme stored in said abstraction scheme storage section to the object data of said node; and extracting other nodes, each of which has identification data different from that of the user of the node, which has the object data abstracted by said abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value.

10. The data management method according to claim 9, wherein said abstraction scheme storage section relates and stores an abstraction scheme and a the priority, and wherein said data management method further comprises:

abstracting, when the number of other nodes is less than the threshold value, the object data of said node by the abstraction scheme, related to the priority determined based on the number of times of the abstraction, of the abstraction schemes stored in said abstraction scheme storage section, and extracting the other nodes to said node having the object data abstracted by said abstracting section, and outputting the object data of said node as the anonymity data when the number of other nodes is equal to or more than the threshold value.

11. A data processing method of an information management apparatus, which comprises a user data storage section which stores position data received from each of a plurality of mobile terminals as action history every user, wherein the position data contains position measurement data showing a position of said mobile terminal and accompaniment data composed of measurement time of the position measurement data and identification data of a user of said mobile terminal, and a abstraction scheme storage section which stores an abstraction scheme of the position data, said data processing method comprising:

receiving position data periodically from said mobile terminal;

generating a power set to at least one position data of action history stored in said user data storage section, and generating a node composed of identification data of the user of the position data and object data by using each element of the power set as the object data;

registering on said node, a movement data set having as an element, at least one of the position data showing a position before movement to a position shown by the object data and the position data showing a position after the movement from the position shown by the object data, with respect to the object data contained in said node;

applying the abstraction scheme stored in said abstraction scheme storage section to the object data of said node; and extracting other nodes, each of which has identification data different from that of the user of the node, which has the object data abstracted by said abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value.

12. The data management method according to claim 11, wherein said outputting the object data of said node as the anonymity data comprises:
   calculating a diversity adaptivity rate every position data to all the position data contained in the object data, and outputting the object data of said node as the anonymity data when the diversity adaptivity rates of all the position data are equal to or higher than a threshold value,
   wherein the diversity adaptivity rate of the position data is a value showing the number of combinations in which the position data of said node overlap the position data of the other users, of $(2^{n-1}-1)$ combinations obtained by subtracting a combination when all the position data overlap from $(2^{n-1})$ combinations of overlapping of positions of each position data, when there are n position data, and
   wherein said applying the abstraction scheme comprises:
   abstracting, when the diversity adaptivity rates of all the position data are less than the threshold value, the position data having the lowest diversity adaptivity rate once.

13. A non-transitory computer-readable storage medium in which a program code is stored to attain a data processing method of an information management apparatus, which comprises a user data storage section which stores position data received from each of a plurality of mobile terminals as action history every user, wherein the position data contains position measurement data showing a position of said mobile terminal and accompaniment data composed of measurement time of the position measurement data and identification data of a user of said mobile terminal, and a abstraction scheme storage section which stores an abstraction scheme of the position data,
   wherein said data processing method comprises:
   receiving the position data periodically from said mobile terminal;
   generating a node composed of the identification data of the user of the position data and object data, by using each of the position data of the action history stored in said user data storage section as the object data;
   registering on said node, a movement data set having as an element, at least one of the position data showing a position before movement to a position shown by the object data and the position data showing a position after the movement from the position shown by the object data, with respect to the object data contained in said node;
   applying the abstraction scheme stored in said abstraction scheme storage section to the object data of said node; and
   extracting other nodes, each of which has identification data different from that of the user of the node, which has the object data abstracted by said abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value.

14. The non-transitory computer-readable storage medium according to claim 13, wherein said abstraction scheme storage section relates and stores an abstraction scheme and a the priority, and
   wherein said data management method further comprises:
   abstracting, when the number of other nodes is less than the threshold value, the object data of said node by the abstraction scheme, related to the priority determined based on the number of times of the abstraction, of the abstraction schemes stored in said abstraction scheme storage section, and
   extracting the other nodes to said node having the object data abstracted by said abstracting section, and outputting the object data of said node as the anonymity data when the number of other nodes is equal to or more than the threshold value.

15. A non-transitory computer-readable storage medium in which a program code is stored to attain a data processing method of an information management apparatus, which comprises a user data storage section which stores position data received from each of a plurality of mobile terminals as action history every user, wherein the position data contains position measurement data showing a position of said mobile terminal and accompaniment data composed of measurement time of the position measurement data and identification data of a user of said mobile terminal, and a abstraction scheme storage section which stores an abstraction scheme of the position data,
   wherein said data processing method comprises:
   receiving position data periodically from said mobile terminal;
   generating a power set to at least one position data of action history stored in said user data storage section, and generating a node composed of identification data of the user of the position data and object data by using each element of the power set as the object data;
   registering on said node, a movement data set having as an element, at least one of the position data showing a position before movement to a position shown by the object data and the position data showing a position after the movement from the position shown by the object data, with respect to the object data contained in said node;
   applying the abstraction scheme stored in said abstraction scheme storage section to the object data of said node; and
   extracting other nodes, each of which has identification data different from that of the user of the node, which has the object data abstracted by said abstracting section, and object data of a same position as a position of the object data of the node or a position contained in a position of the object data of the node, and each of which has a movement data set with which a product set of the movement data set of the node is an empty set, and outputting the object data of the node as anonymity data when the number of other nodes is equal to or more than a predetermined threshold value.

16. The non-transitory computer-readable storage medium according to claim 15, wherein said outputting the object data of said node as the anonymity data comprises:
   calculating a diversity adaptivity rate every position data to all the position data contained in the object data, and outputting the object data of said node as the anonymity data when the diversity adaptivity rates of all the position data are equal to or higher than a threshold value, wherein the diversity adaptivity rate of the position data is a value showing the number of combinations in which the position data of said node overlap the position data of the other users, of $(2^{n-1}-1)$ combinations obtained by subtracting a combination when all the position data overlap from $(2^{n-1})$ combinations of overlapping of positions of each position data, when there are n position data, and wherein said applying the abstraction scheme comprises:

abstracting, when the diversity adaptivity rates of all the position data are less than the threshold value, the position data having the lowest diversity adaptivity rate once.

\* \* \* \* \*